(12) United States Patent
Morioka et al.

(10) Patent No.: US 6,333,742 B1
(45) Date of Patent: Dec. 25, 2001

(54) SPOTLIGHT CHARACTERISTIC FORMING METHOD AND IMAGE PROCESSOR USING THE SAME

(75) Inventors: Seisuke Morioka; Keisuke Yasui, both of Tokyo (JP)

(73) Assignee: Sega Enterprises, Ltd. (JP)

( * ) Notice: Subject to any disclaimer, the term of this patent is extended or adjusted under 35 U.S.C. 154(b) by 0 days.

(21) Appl. No.: 09/214,494

(22) PCT Filed: Mar. 31, 1998

(86) PCT No.: PCT/JP98/01475

§ 371 Date: Dec. 30, 1998

§ 102(e) Date: Dec. 30, 1998

(87) PCT Pub. No.: WO98/50890

PCT Pub. Date: Nov. 12, 1998

(30) Foreign Application Priority Data

May 7, 1997 (JP) .................................................... 9-115971
Jul. 1, 1997 (JP) .................................................... 9-175904

(51) Int. Cl.[7] ...................................................... G06F 15/00
(52) U.S. Cl. ............................................................. 345/426
(58) Field of Search ................................... 345/419, 418, 345/426, 433, 427, 428

(56) References Cited

FOREIGN PATENT DOCUMENTS

| 4-127386 | 4/1992 | (JP) . |
|---|---|---|
| 4-315274 | 11/1992 | (JP) . |
| 6-301794 | 10/1994 | (JP) . |
| 8-161527 | 6/1996 | (JP) . |
| 10-63874 | 3/1998 | (JP) . |

Primary Examiner—Phu K. Nguyen
(74) Attorney, Agent, or Firm—Dickstein Shapiro Morin & Oshinsky LLP

(57) ABSTRACT

A table is used in forming spotlight characteristics that impart illumination effects to polygon images displayed by an image processing system, and the number of light sources that can be used in an image scene is increased above the number of light sources that can be used simultaneously. In order to realize this, a method of forming spotlight effect characteristics attached to pixels configuring polygons is proposed wherein a plurality of characteristic values corresponding to a prescribed spotlight characteristic curve is held in a table, and said spotlight characteristic curve is formed from characteristic values read out from the table and from interpolated values found by interpolating between adjacent characteristic values. Inner products are found between spot light axis vectors and light vectors extending toward pixels, these values of inner products so found are used as addresses, and characteristic values are read out from appropriate addresses of the table. Also comprised are a buffer for preserving data on light sources exceeding the number of light sources that can be used simultaneously by the image processing system, means for attaching light source identifier symbols in a number equal to the number of light sources affecting each polygon, means for reading out light source information from the buffer according to the light source identifier symbol, and means for performing shading according to the light source information.

20 Claims, 19 Drawing Sheets

FIG. 17

| LIGHT SOURCE IDENTIFIER SYMBOL (ADDRESS) | LIGHT SOURCE DESIGNATION | |
|---|---|---|
| | LIGHT SOURCE INFORMATION | |
| R1 | 0 0 0 0 0 0 | a, b, c, d |
| R2 | 0 0 0 0 0 1 | c, d, e, f |
| R3 | 0 0 0 0 1 0 | e, f, g, h |
| R4 | 0 0 0 0 1 1 | g, h, i, j |
| R5 | 0 0 0 1 0 0 | i, j, k, l |
| ... | ............ | ............ |
| R64 | 1 1 1 1 1 1 | w, x, y, z |

SPOTLIGHT CHARACTERISTIC FORMING METHOD AND IMAGE PROCESSOR USING THE SAME

BACKGROUND OF THE INVENTION

1. Field of the Invention

This invention pertains to a method of forming spotlight characteristics in order to impart a spotlight effect to objects graphically displayed by computer graphics technology, and to an image processing system wherein said method is employed.

2. Description of the Related Art

In recent years there has been a proliferation of image processing systems that employ computer graphics technology in graphically displaying objects placed in virtual three-dimensional space with multiple polygons. Research and development continues in efforts to make the displayed objects increasingly realistic.

One aspect of such computer graphics technology is shading process technology for imparting light illuminating effects on the surfaces of objects displayed. The impartation of special effects such as shining a spotlight onto an object is one method included among such shading processes.

The Open GL (trademark) method developed by Silicon Graphics is a technology for imparting spotlight characteristics that is known in the prior art. Referring to FIG. 1, if we consider a light vector L extending from a spot light source O in the direction of a prescribed point P, and a light-source axis vector D moving from the sport light source O toward the object, the Open GL (trademark) method designates parameters for the spotlight characteristics called "spotexp" and "cutoff" which are calculated by Equation 1 below. The spotlight effect characteristics at this time are as shown in the graph in FIG. 2.

$$\left.\begin{array}{l} L = (Lx, Ly, Lz) \\ D = (dir\_x, dir\_y, dir\_z) \\ SpotEffect = \begin{cases} 0 & L \cdot D < \text{cutoff} \\ \max(L \cdot D, 0)^{spotexp} & L \cdot D \geq \text{cutoff} \end{cases} \end{array}\right\} \quad (1)$$

As shown in FIG. 2, when "spotexp" is made a large value, the spot becomes a spot having a narrowed shape. When actually used, however, in almost all cases the spot characteristics are considered in terms of spot spread angle. Accordingly, it is necessary to find by an inverse operation that "spotexp" at which the "spotEffect" will be at or below a certain value at the designated spot spread angle. Such inverse operations involve computational processing that is not simple.

And, even supposing that the value of "spotexp" has been determined by a reverse operation, the shape of the spot characteristic curve is different depending on the value of "spotexp," as seen in FIG. 2. For that reason, there is a danger that the result will be very different from the perception of an observer actually viewing the drawn image.

Furthermore, the shape of the spot characteristic curve is determined uniquely by the value of "spotexp," wherefore it cannot be designated independently of the spot spread and intensity distribution. As a consequence, it is not possible to obtain characteristics such that the spot spread is narrow, and the intensity distribution is roughly constant, as with a searchlight, and the result is an indistinct spot light.

The "cutoff" parameter, on the other hand, is such that, if some angle taken as a boundary is exceeded, the value of the "spotEffect" is taken as 0. Accordingly, it is a parameter which specifies an angle, and different from "spotexp," wherefore it is easy to control. The intensity distribution becomes discontinuous, however, so that only spotlight characteristics are obtainable wherewith the spot edge is sharp and the intensity distribution is constant. This constitutes a shortcoming.

In other words, "cutoff" is the limiting value of light spread which, if exceeded, results in the spot illuminating effect becoming zero. When a "cutoff" is established, this limiting region becomes conspicuous, which is a problem.

Meanwhile, there are also methods, including softimage developed by Microsoft, wherewith the fade-start angle (cone angle) and fade-end angle (spread angle) of the spot are designated, as diagrammed in FIG. 3. With this method, the spot characteristics are calculated using Equation 2 below. When this second method is used, since characteristics are designated with angles, control is easy and the calculations are simple.

$$SpotEffect = \begin{cases} 0 & L \cdot D < \text{spread\_angle} \\ 1 & L \cdot D \geq \text{cone\_angle} \\ \dfrac{L \cdot D - \text{spread\_angle}}{\text{cone\_angle} - \text{spread\_angle}} & \text{cone\_angle} > L \cdot D \geq \text{spread\_angle} \end{cases} \quad (2)$$

However, these characteristics are such as are diagrammed in FIG. 4, with variation in characteristic values being linear, so spot characteristics cannot be obtained resembling a proper curve such as with open GL (trademark).

Accordingly, there is a problem in that, as depicted in FIG. 3, an unnatural edge emphasis occurs at the position of the fade-start angle (cone angle). By edge emphasis here is meant a visual effect wherewith brightness variation is not continuous in regions adjacent to a boundary region, and the boundary brightness is emphasized.

A block diagram is given here, in FIG. 5, of one example of a conventional image processing system. In FIG. 5, a CPU 1 is for controlling the execution of programs for processing images using polygons. This CPU 1 reads out polygon data from a polygon buffer 11, and outputs to a coordinate converter 2.

The coordinate converter 2 converts polygon three-dimensional data to two-dimensional coordinates so that they can be displayed on a CRT display monitor 7. The polygon data coordinate-converted to two-dimensional coordinates are sent to a fill-in circuit 30 and a texture generator circuit 31.

The fill-in circuit 30 computes information on pixels that are within a range that is enclosed by the apexes of the polygons. The computation for the fill-in noted above performs linear interpolation, for example, on information on pixels between the polygon apexes, based on information on two corresponding apexes. The texture generator circuit 31 is a circuit that reads out texture corresponding to a pixel from an internal texture buffer, and determines colors for each pixel by computation. The output from the texture generator circuit 31 is sent as pixel data to the shading circuit 32.

The shading circuit 32 is a circuit for determining the spotlight-based illumination effects, such as noted above, that are based on the pixel data and imparted to the pixels. The output of the shading circuit 32 is sent to a color modulation circuit 12 and a mixing circuit 33. The color modulation circuit 12 is a circuit that does color modulation on each pixel, based on the results determined by the shading circuit 32, for example. The mixing circuit 33 mixes polygon pixel color information with color information drawn previously, writing these data in frames to a frame buffer 5. The information in this frame buffer 5 is displayed on the CRT display monitor 7.

Next is described a light source characteristic forming method that is conventionally implemented in the shading circuit 32 of an image processing system configured as described in the foregoing. In the example of the prior art diagrammed in FIG. 5, in some cases, four light source registers 329 and four corresponding light source arithmetical units (not shown) are configured in the shading circuit 32, which is capable of processing information from four light sources simultaneously.

In a case where light sources a, b, c, and d are used in one image scene, information on each light source, namely a, b, c, and d, is stored beforehand in the light source registers A, B, C, and D. The shading circuit 32 computes what kind of effect the light sources a, b, c, and d will have on each pixel based on the information on the light sources a, b, c, and d that is stored in the light source registers 329.

Light source information includes, for example, spot axial direction vectors (Dx, Dy, Dz), a cutoff angle (Cutoff), and fade width normalization coefficient (Penumbra scale), as described by either FIG. 1 or FIG. 3. The shading circuit 6 performs shading computations based on such light source data as these, adds the results together, and computes the effects that the four light sources have on each pixel.

Thus, with the prior art, light source registers 329 and light source arithmetical units in numbers exactly coinciding with the number of light sources that can be used in one image scene are provided. In general, the number of light sources in one image scene is the same as the number of light source registers 329 and light source arithmetical units. That being so, in the case where 100 light sources are used in one image scene, for example, 100 light source registers 329 and a like number of light source arithmetical units have to be provided, shading computations have to be performed from the 100 light sources, these results have to be added together, and the effects of 100 light sources have to be computed for each pixel. In terms of hardware size, however, this is not practicable.

If, on the other hand, the system is of a state-machine type, it is possible to increase the number of apparent light sources by sequentially rewriting the light source parameters, but this is difficult to manage. And in a system containing Z-sorts or the like, wherein polygon drawing order is not preserved, the number of apparent light sources cannot be increased.

SUMMARY OF THE INVENTION

As noted in the foregoing, there are problems with all of the methods proposed in the prior art for imparting spotlight effects. Accordingly, an object of the present invention is to provide a spotlight characteristic forming method, and an image processing system employing such method, wherewith such problems are resolved.

Another object of the present invention is to provide a spotlight characteristic forming method, and an image processing system employing such method, wherewith the complex operations that in the prior art are implemented by computer processing using arithmetical units are implemented using tables.

In conventional image processing systems such as described in the foregoing, moreover, when multiple light sources are used in one image scene, it is necessary to perform shading computations a number of times equal to the number of light sources, and to add those results together. Providing numbers of light source registers and light source arithmetical units equal to the number of light sources used in one image scene results in an enormous quantity of hardware.

However, in one scene in an actual game story, the strong effects of a light source on one polygon are limited to those light sources positioned close to that polygon, or to light sources of strong intensity. Even when there are 100 light sources in an image scene, for example, the strong effects on one polygon are limited to those of four or five light sources close to that polygon. In such cases, it is not necessary to compute the effects of all the light sources in the image scene. In most cases, it will be sufficient to perform shading computations only for those light sources from which strong effects are encountered.

That being so, another object of the present invention is to provide an image processing method, and an image processing system, wherewith it is possible to increase the number of light sources that can be used in one image scene, while keeping the number of light sources that can be processed by the shading circuit unchanged.

In the basic configuration of a spotlight characteristic forming method and image processing system employing that method that realize the objects of the present invention noted above, multiple characteristic values corresponding to a prescribed spotlight characteristic curve are incorporated into a table, and the characteristic curve of that spotlight is formed from characteristic values read out from that table or from interpolated values found by interpolating between mutually adjacent characteristic values read out from that table.

In the present invention, multiple characteristic values corresponding to a spotlight characteristic curve are incorporated into a table beforehand. The configuration is also such that characteristic values read out from the table, or interpolated values found by interpolating between mutually adjacent characteristic values read out from the table, are used. Accordingly, multiple characteristic values can be associated with a spotlight characteristic curve, wherefore any spotlight characteristics can be formed.

Characteristic values incorporated beforehand into a table are used, so complex computations are not necessary. In terms of the specific configuration, characteristic values are read out from table addresses corresponding to the inner products between spotlight optical axis vectors and light vectors extending from light sources toward pixels or from pixels toward light sources.

In addition, it is easy to impart non-circular spot effects by implementing a configuration wherein a spotlight optical axis vector and at least two axes perpendicular to that spotlight optical axis vector are defined, characteristic values are read out from the table corresponding to the angles subtended between at least two planes defined, respectively, by a spotlight optical axis vector and at least two axes perpendicular thereto, and orthogonal projections for at least two planes of light vectors extending from the light sources toward the pixels or from the pixels toward the light sources, and spotlight characteristic curves are formed from the characteristic values so read out or from interpolated values between mutually adjacent characteristic values read out from the table.

As based on the present invention, moreover, in an image processing system that imparts light-source based illumination effects to objects graphically displayed by multiple polygons, a memory that preserves information on multiple light sources, means for implementing shading based on information on a prescribed number of light sources for one polygon, and means for reading out the information on the prescribed number of light sources, corresponding to the polygon, from the memory, and supplying that information to the shading implementing means, are comprised.

Accordingly, when computing how the light sources affect each polygon, it is not necessary to compute the effects from every light source in an image scene. If only information on a prescribed number of light sources specified by light source identifier symbols attached to each polygon is read out, and shading processing is performed only for those light sources, it is possible to use a number of light sources in an image scene that, apparently, exceeds the number of light sources that can be used simultaneously.

The objects stated above can also be realized by comprising, in an image processing system that imparts light-source based illumination effects to objects graphically displayed by multiple polygons, a memory that preserves multiple information groups on multiple light sources, means for implementing shading based on groups of information on a plurality of light sources for one polygon, and means for reading out the information groups on the plurality of light sources, corresponding to the polygon, from the memory, and supplying the information groups to the shading implementing means.

Accordingly, when the number of light sources that can be used simultaneously by the image processing system is a plural number, information on that plurality of light sources can be plurally preserved as one group in a buffer, and the light source identifier symbols attached to each polygon can read out light source information from the buffer in groups. For this reason, the process of selecting light source information for each polygon is eliminated, making it possible to improve processing speed.

The objects stated in the foregoing can also be realized with an image processing method for imparting light source-based illumination effects to objects graphically displayed by multiple polygons that comprises the steps of: (1) writing information on light sources used in an image scene to memory; (2) applying identifier symbols to each polygon affected by a light source; (3) performing coordinate conversions on polygon data; (4) writing identifier symbols to each polygon pixel; (5) generating texture based on pixel data; (6) reading information on light sources corresponding to identifier symbols out from memory; (7) shading pixels; and (8) writing pixel data to a frame buffer.

Accordingly, since it is only necessary to compute, for each pixel in a polygon, the effects of the light sources specified by the light source identifier symbols, it is possible to improve shading processing speed.

As based on the present invention, moreover, light sources configuring a group of light sources can be used in a way wherewith at least some will overlap relative to each polygon. That being so, by using light sources so that some of them overlap, it is possible to keep the number of light sources that can be used simultaneously unchanged and yet use a number of light sources in a scene that exceeds that number.

Other objects and characteristics of the present invention will be made clear from the embodiments described below with reference to the drawings.

BRIEF DESCRIPTION OF THE DRAWINGS

FIG. 17 is a diagram indicating the contents of the light source buffer in the example configuration diagrammed in FIG. 16;

FIG. 20 is a diagram describing one image scene in an embodiment of the present invention.

DESCRIPTION OF THE PREFERRED EMBODIMENTS

Figure 1:
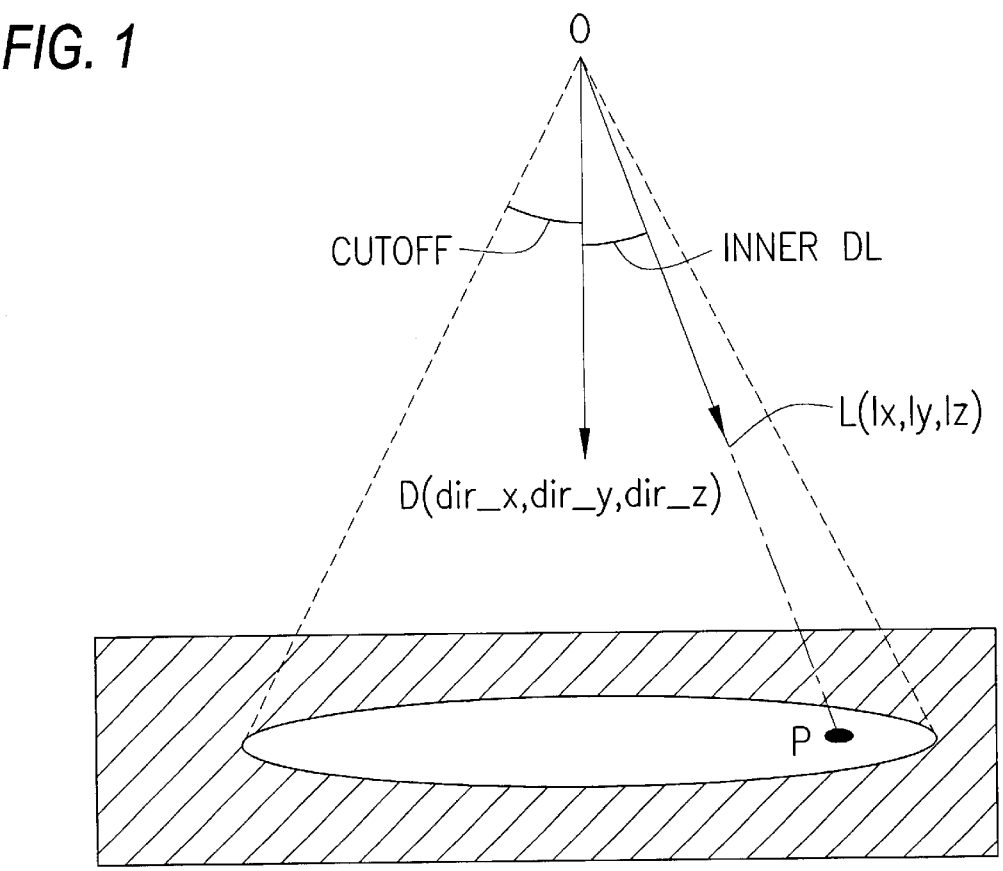
FIG. 1 is a diagram for describing the Open GL method.
Figure 2:
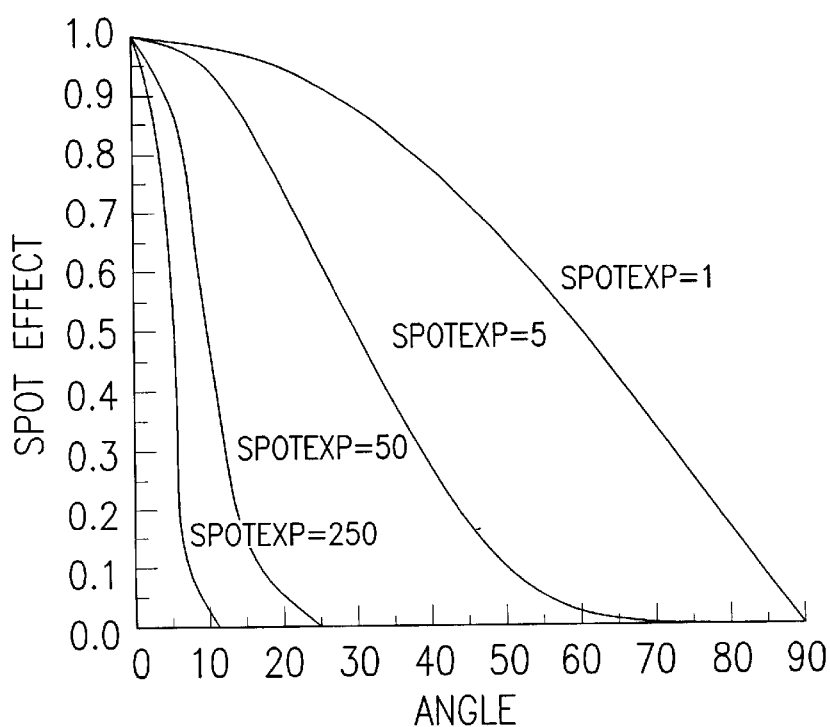
FIG. 2 is a diagram representing spot characteristics based on the Open GL method.
Figure 3:
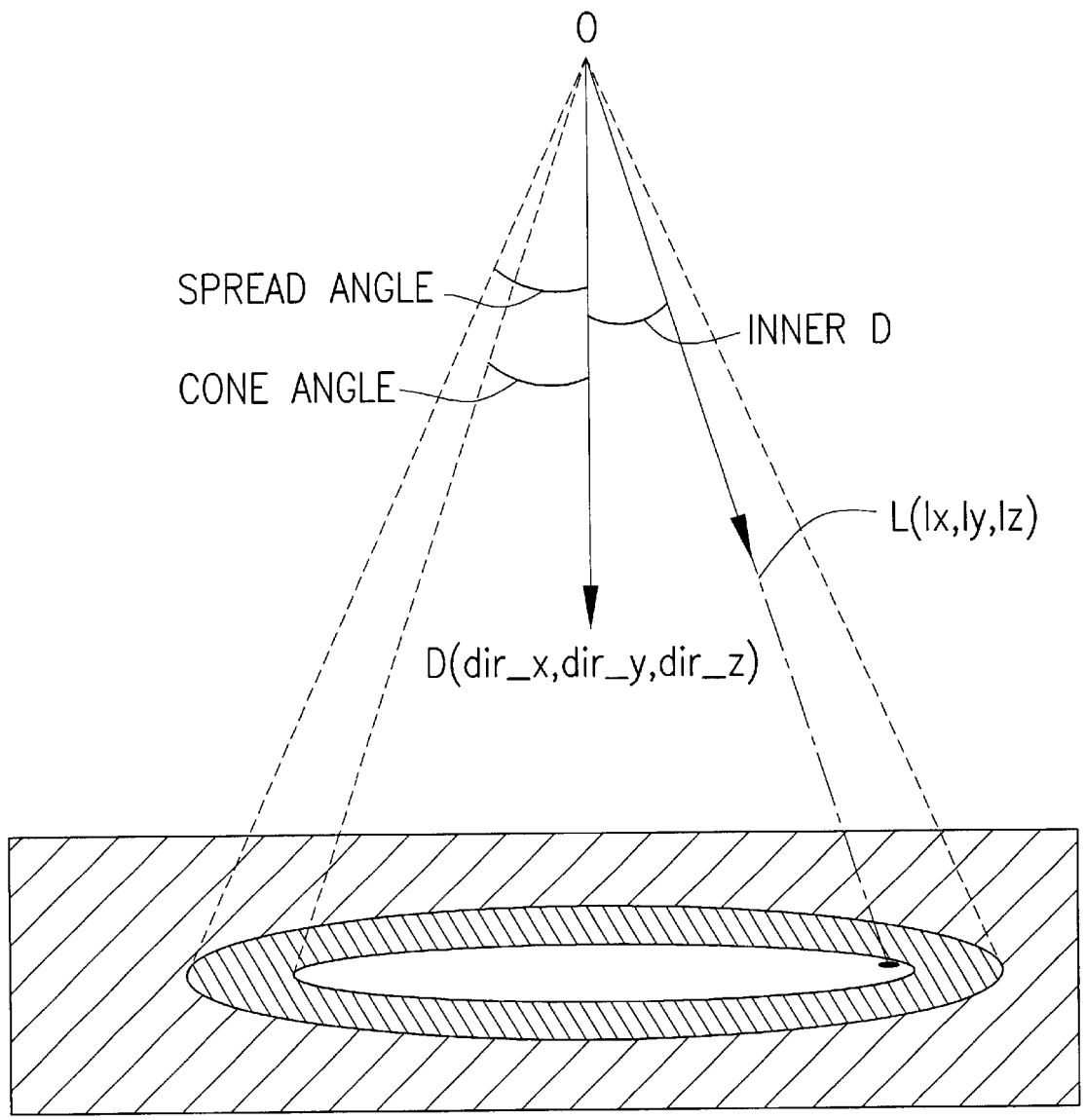
FIG. 3 is a diagram for describing a method of designating spot fade-start angle (cone angle) and fade-stop angle (spread angle)
Figure 4:
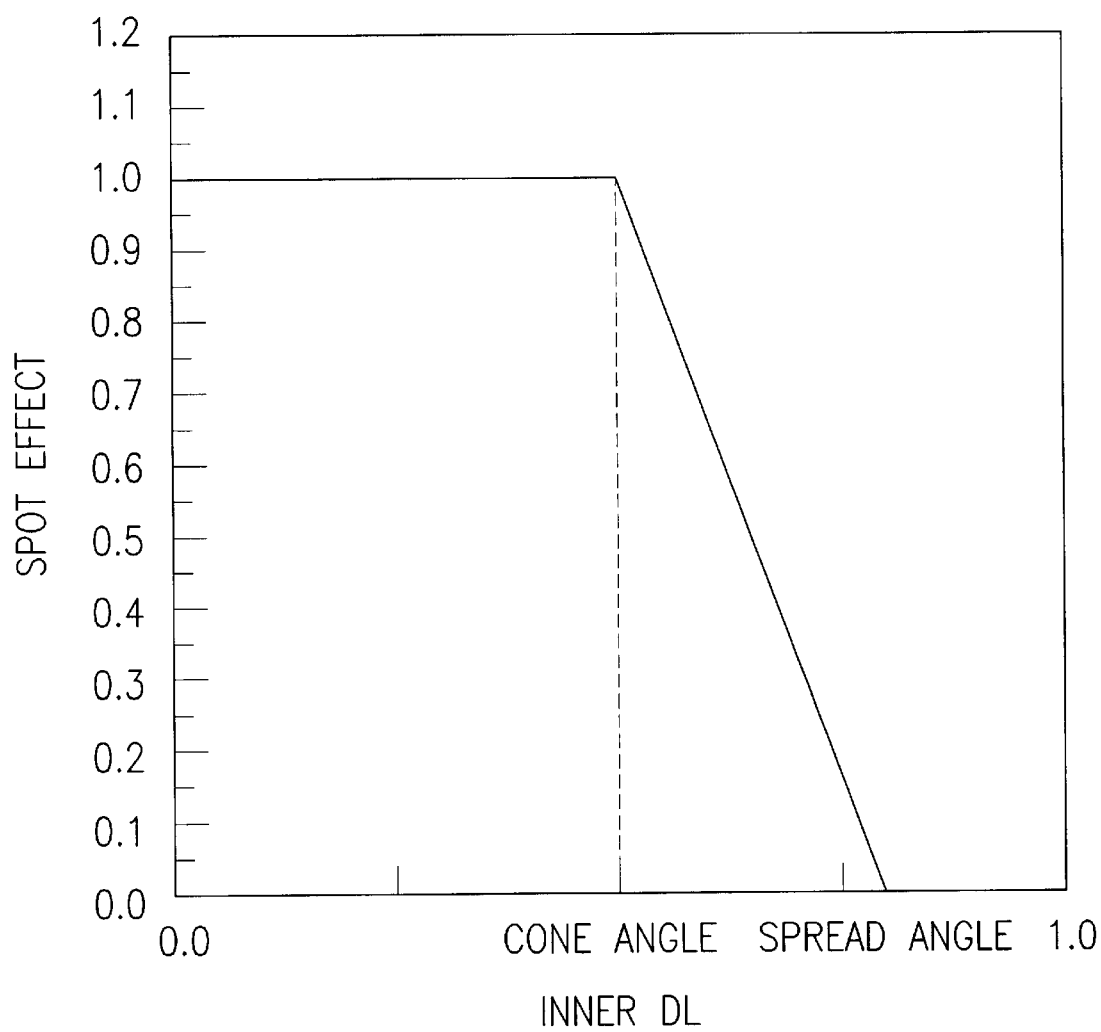
FIG. 4 is a diagram representing spot characteristics based on the method diagrammed in FIG. 3.
Figure 5:
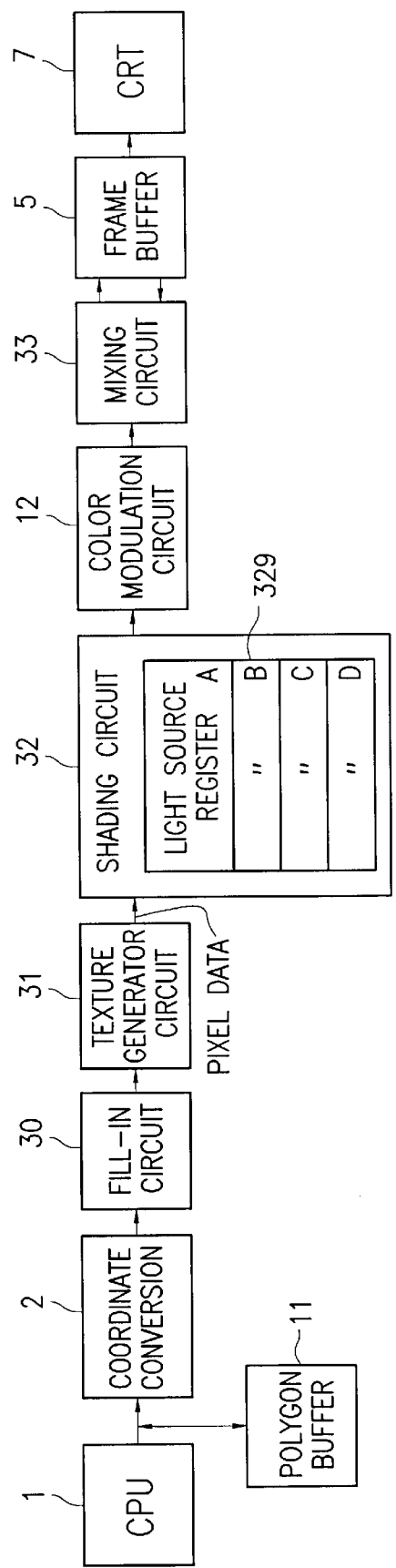
FIG. 5 is a block diagram of an example configuration of a convention image processing system.

Embodiments of the present invention are now described with reference to the drawings. In the drawings, the same reference numbers or reference symbols are assigned to the same or similar items.

Figure 6:
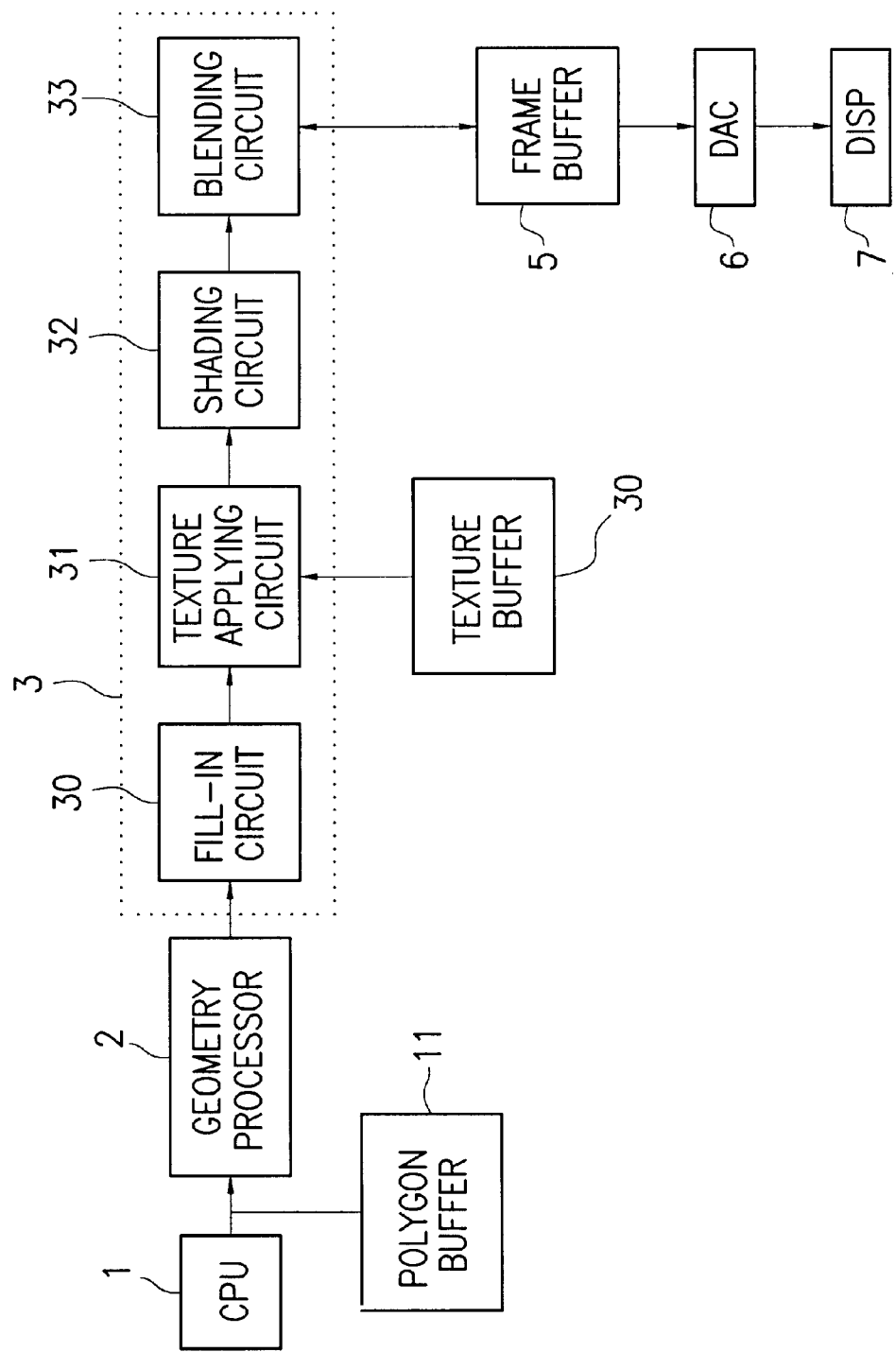
FIG. 6 is a block diagram of an example configuration of an image processing system employing the spotlight characteristic forming method of the present invention.

FIG. 6 is a block diagram of an example configuration of an image processing system employing the spotlight characteristic forming method of the present invention.

In FIG. 6, a CPU 1 is for controlling the execution of programs for processing images using polygons. The CPU 1, as a program advances, temporarily stores apex data for polygons to be displayed on a display monitor 12 and register setting functions in a polygon buffer 11.

Data read out from this polygon buffer 11 are input to a geometry processor 2. The geometry processor 2 converts the input data to a two-dimensional coordinate system in order to display polygons arranged in three-dimensional space on the display monitor 7 as the program in the CPU 1 is executed.

A rendering processor 3 is connected for applying color, shading, and texture to the polygons to be displayed. On the output side of the rendering processor 3 is connected a frame buffer 5 wherein is stored one screen of data to be displayed.

To the frame buffer 5 is connected a CRT or other display monitor 7, through a D/A converter circuit 6, whereon the contents of the frame buffer 5 are sequentially displayed.

Here the geometry processor 3 noted above reads out polygon apex data (containing apex coordinates, apex colors, texture map coordinates, apex transparency, and apex normal vectors, etc.) and register setting functions from the polygon buffer memory 11, corresponding to the processing speed and advance of the program by the CPU 1.

The geometry processor 2 places polygons in three-dimensional space based on the apex coordinate data, and performs viewport decisions on which regions are to be included for display in three-dimensional space, etc. It also performs clipping, that is, the removal of apexes of polygons that protrude outside a viewport. It also performs coordinate conversion from three-dimensional to two-dimensional, projecting polygons placed in a viewport onto a two-dimensional plane, based on a specified viewpoint.

The polygon data coordinate converted to two-dimensional coordinates are sent to the rendering processor 3. The rendering processor 3 comprises a fill-in circuit 30, texture applying circuit 31, shading circuit 32, and blending circuit 33.

The fill-in circuit 30 has functions for computing information for pixels that are in a range enclosed by the polygon apexes, and passing this information to the other circuits in the rendering processor 3. The computations for the filling in noted above are such as, for example, linear interpolations based on information on two apexes corresponding to information on apexes between polygon apexes.

The texture applying circuit 31 is a circuit that reads textures corresponding to pixels from a texture buffer 4, and computes colors for each pixel. The shading circuit 32 is a circuit that imparts illumination effects to polygons based on polygon apex data. It is in this circuit that a method of spotlight characteristic formation following the present invention is implemented. Accordingly, the details and functions of this shading circuit 32 are described later.

The output of the shading circuit 32 is sent to the blending circuit 33. The blending circuit 33, as necessary, mixes pixel color information for polygons previously drawn, read in from the frame buffer 11, with pixel color information for polygons newly processed, and writes the results to the frame buffer 5. The information in this frame buffer 5, for one full screen, is sent via the D/A converter circuit 6 to the display monitor 7 and displayed.

Although omitted in the diagram in FIG. 6, a depth test functional unit is also provided here in the rendering processor 3. This depth test functional unit compares the fore-and-aft relationship between multiple polygons, and stores data on polygons placed front-most in a depth buffer (not shown).

In other words, in the depth buffer are stored the Z axes of pixels for graphics (polygons) previously drawn. And, when a new polygon is to be displayed in a position superimposed on a polygon previously drawn on the screen, the Z axes of the pixels configuring the new polygon are compared with the Z axes of the pixels of the polygon previously drawn and read out from the depth buffer. If, as a result of this comparison, the new polygon pixels are found to be in front, the Z axes for those pixels are written to the depth buffer.

Next are described a spotlight characteristic forming method employing the present invention and implemented in the shading unit 32 in the image processing system configured as described in the foregoing, and an embodiment configuration for the shading circuit.

Figure 7:
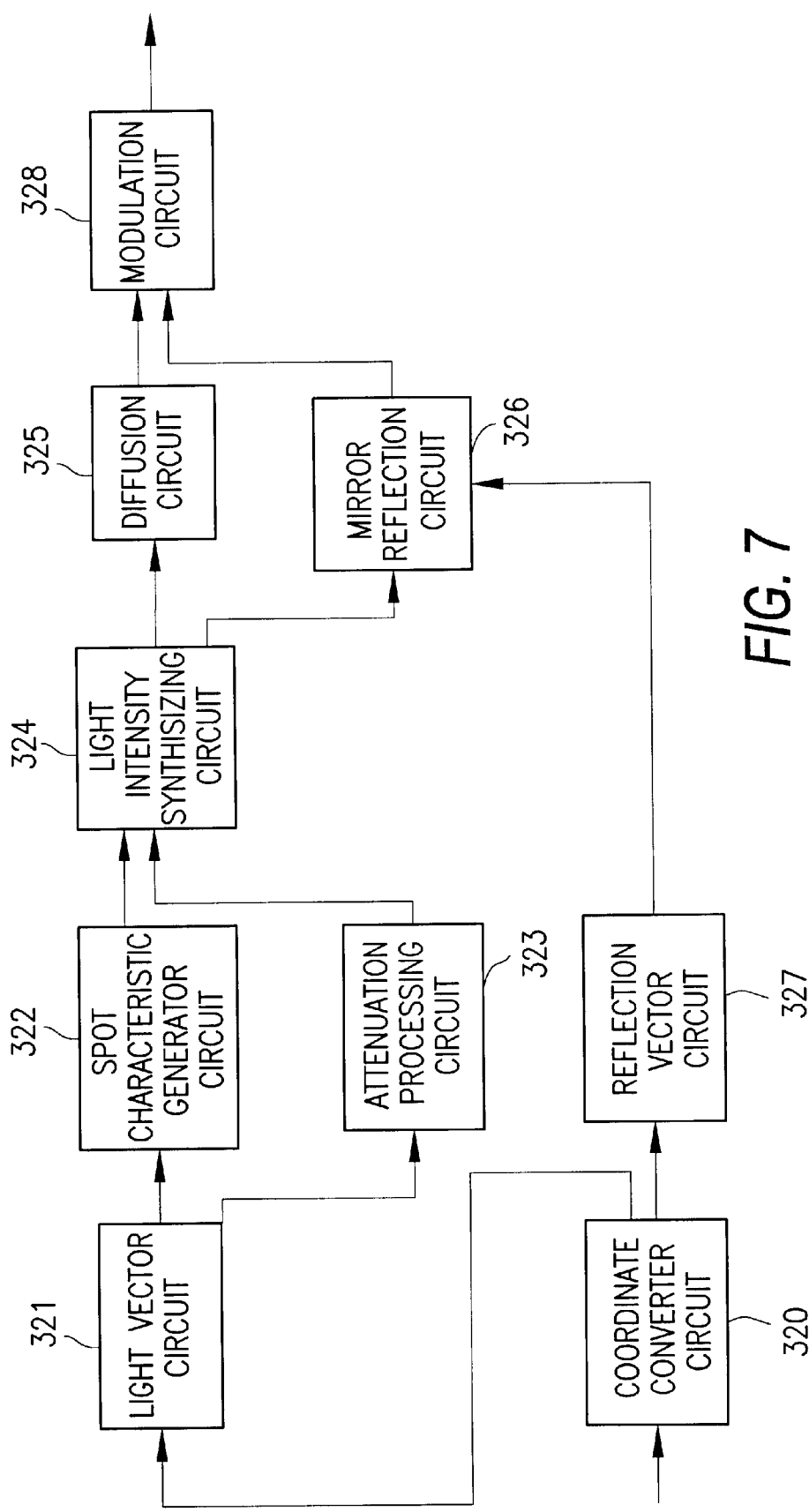
FIG. 7 is a block diagram of an embodiment configuration of a shading circuit employing the present invention.

FIG. 7 is a block diagram of an embodiment configuration of the shading circuit 32 wherein the present invention is applied.

A coordinate inverter circuit 320 is a circuit for converting input two-dimensional coordinate polygon data to three-dimensional coordinate polygon data. The pixel data converted to three-dimensional coordinates by the coordinate converter circuit 320 are split, with one branch input to a light vector circuit 321 and the other branch input to a reflection vector circuit 327.

The light vector circuit 321, based on spot light source positions in virtual three-dimensional space and pixel three-dimensional coordinates, determines light vectors extending from the spot light sources toward the pixels. It also determines data on distances between light sources and pixels.

The light vectors so determined are input to a spot characteristic generator circuit 322. The distance data between light sources and pixels so determined are input to an attenuation processing circuit 323.

Figure 11:
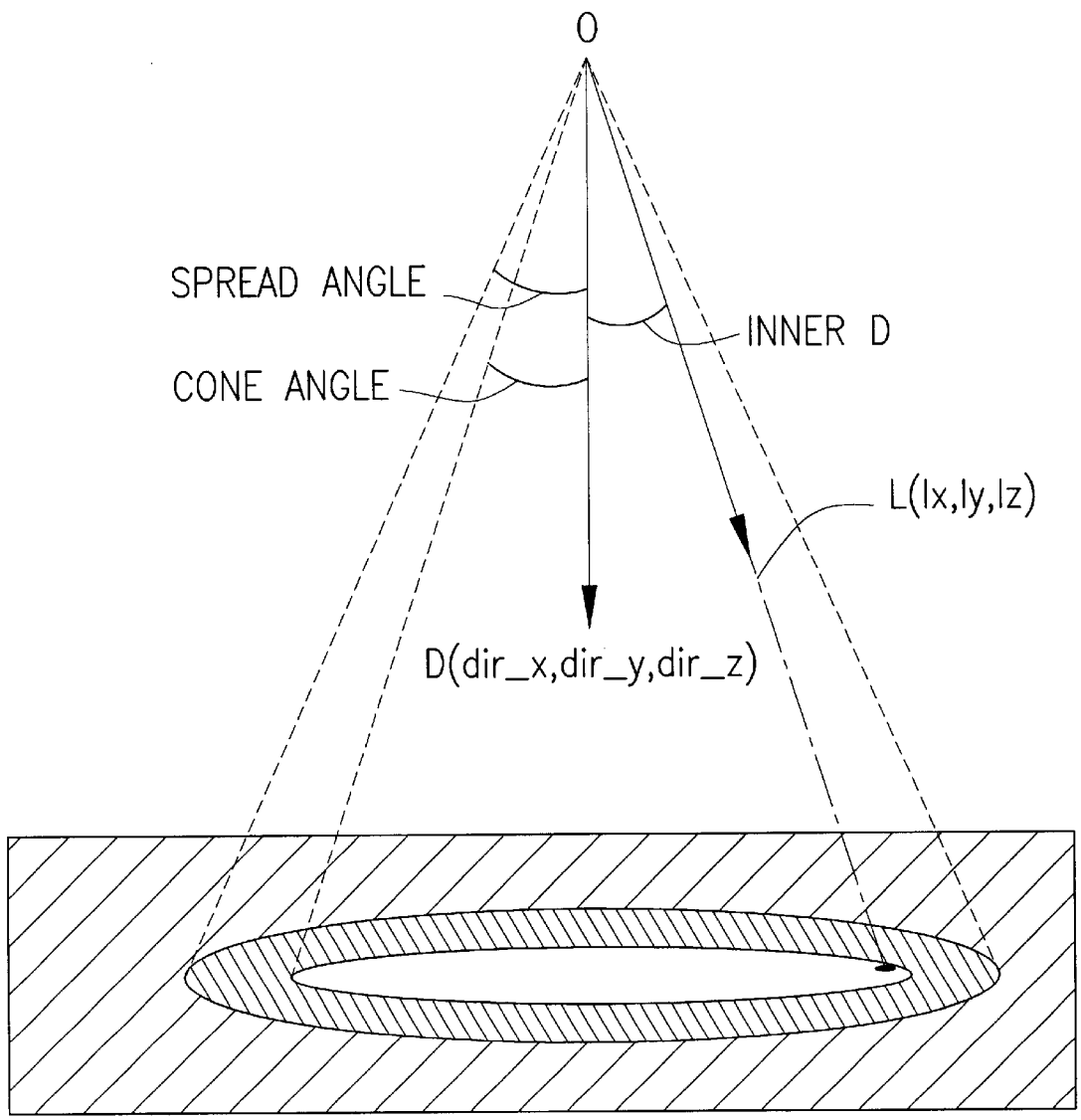
FIG. 11 is a diagram for describing an illumination effect based on a spot light source having an axis vector.
Figure 12:
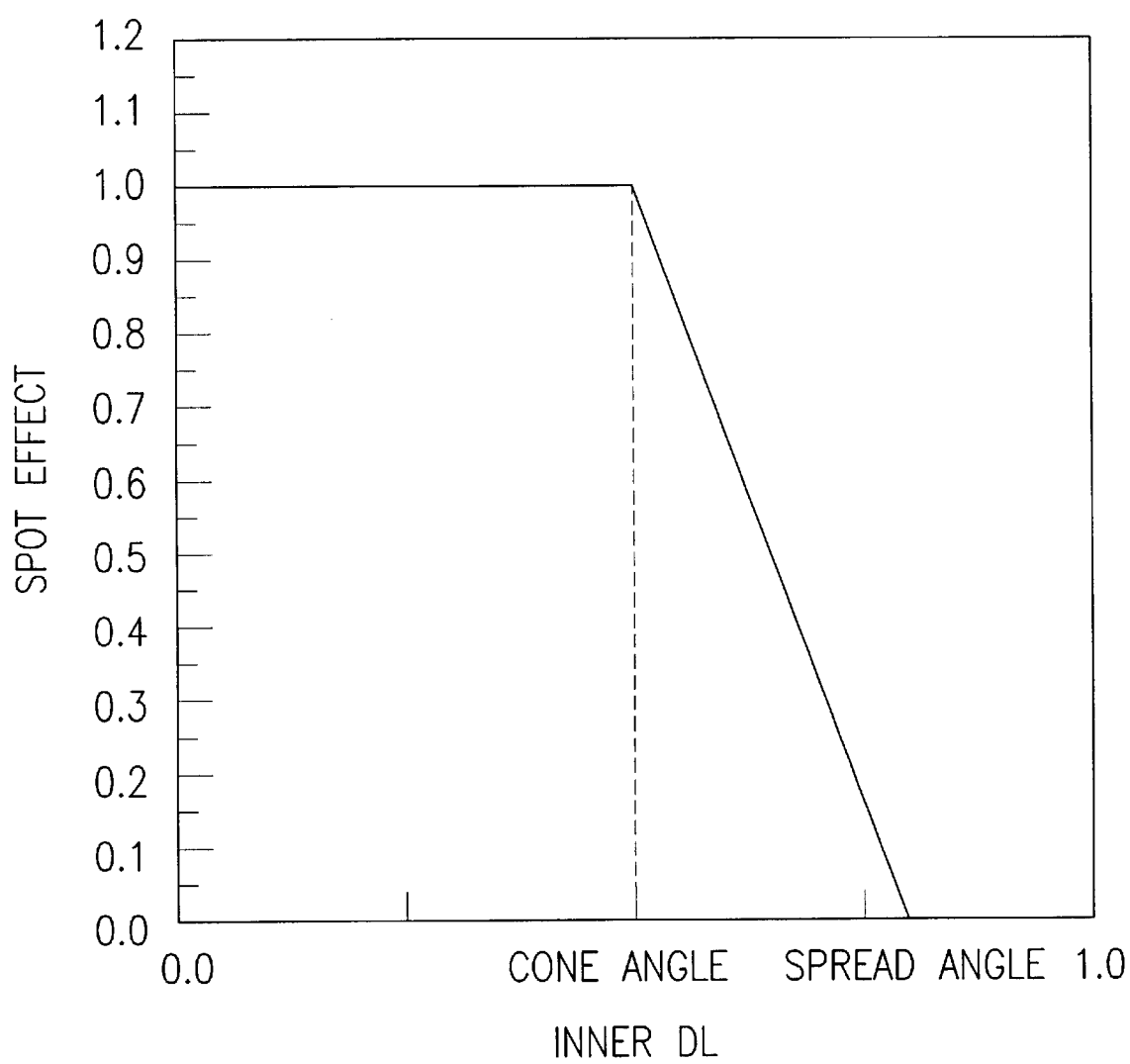
FIG. 12 is a diagram for describing spot effect characteristics in one example based on a spot light source having an axis vector.

An example configuration following the present invention for the spot characteristic generator circuit 322 will be described below. In this circuit, however, as diagrammed in FIG. 11, are determined the spot effect characteristics resulting from a spot light source O having the axis vector 70, one example whereof is represented in FIG. 12.

In the spot characteristic generator circuit 322 is found the inner product 60 of the axis vector 70 of the spot light source and the light vector input for each pixel, that is, the cosine value, which is output as the intensity of the light resulting from the spot light source in the direction of the pixel.

The attenuation processing circuit 323 computes light attenuation quantities based on the distance between the spot light source O and the vectors at issue. Next are determined, from a light intensity synthesizing circuit 324, the light intensities for the pixels at issue, based on the light intensities toward the pixels produced by the spot light source, from the spot characteristic generator circuit 322, and the light attenuation quantities based on distances from the spot light source to the pixels at issue, from the attenuation processing circuit 323.

In other words, the light intensities for each pixel are determined by the attenuation quantities based on the angle subtended between the spot light source axis vector 70 and the light vector of the pixel at issue, and the attenuation quantities based on the distance from the spot light source to the position of the pixel at issue.

Next, based on the light intensities for the pixels determined by the light intensity synthesizing circuit 324, shading effects are imparted to the pixels. These shading effects include a diffuse reflection effect and a mirror reflection effect.

The diffuse reflection effect is so-called irregular reflection, produced by light that penetrates the surface of an object, is absorbed, and is again radiated. This diffuse reflected light radiates evenly in all directions.

For this reason it bears no relation to the viewpoint of an observer. What is important is the angle subtended between the direction from the light source toward the pixel at issue, and the direction of the normal of the surface of the pixel at issue. When this angle exceeds $\pi/2$, the light source enters the shadow of the object and diffuse light reflection does not occur.

Accordingly, the light intensities for the pixels determined by the light intensity synthesizing circuit 324 are input, to which are applied a constant diffusion reflection coefficient, in a diffusion circuit 325, whereby is found the sizes of the diffuse reflected light.

The mirror reflection effect, on the other hand, produces an effect wherein, in a perfect reflecting surface, the angle of the reflected light relative to the incident light becomes the same relative to the normal. Accordingly, the mirror reflection effect can only be observed by an observer who is at an angle which coincides with the angle of the reflected light. For this reason, in order to find the size of the reflected light, the observer's line-of-sight vector is needed.

The mirror reflection circuit 326 inputs light intensities for vectors determined by the light intensity synthesizing circuit 324, whereupon it determines and outputs incident angles at the pixels at issue and reflection quantities from line-of-sight vectors obtained from a reflection vector circuit 327.

The diffuse light quantities from the diffusion circuit 325 noted earlier, and the mirror reflection light quantities from the mirror reflection circuit 326 are synthesized in a modulation circuit 328 and output.

Figure 8:
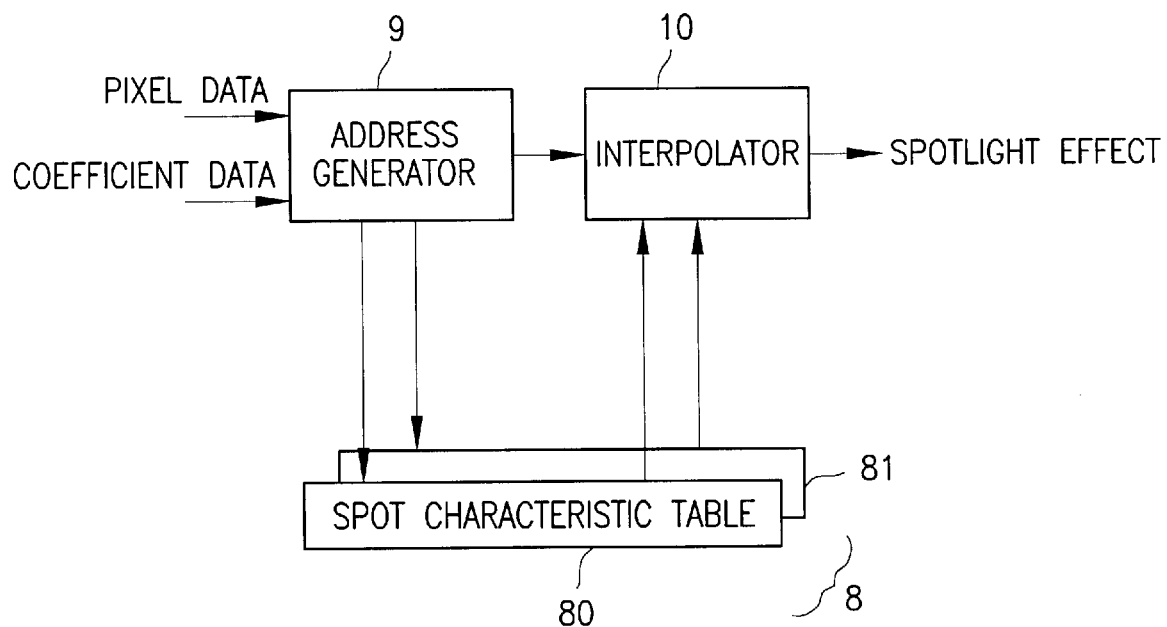
FIG. 8 is a block diagram of an example configuration of a spot characteristic generation circuit, employed in a shading circuit, following the present invention.
Figure 9:
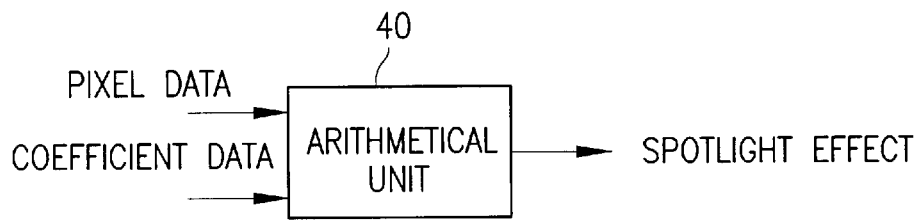
FIG. 9 represents an example of a conventional configuration for comparison to elucidate the characteristics of the circuit diagrammed in FIG. 8.

In FIG. 8 is presented a block diagram of an example configuration of a spot characteristic generator circuit 322, following the present invention, that employs a shading circuit configured as described in the foregoing. FIG. 9 presents an example of a conventional configuration for comparison to elucidate the characteristics of the circuit diagrammed in FIG. 8;

In the configuration in FIG. 9, spot characteristics are determined, by the direct arithmetic operations of an arithmetical unit 40, from pixel data and coefficient data. In such cases, as described earlier in conjunction with FIGS. 1 to 4, the computation is complex, and it is very difficult to form spot characteristics at will.

With the present invention, however, which is a method employing a table, as will be described below, complex computations are not necessary, and it is possible to form any desired spot characteristics from data stored in the tables.

The spot characteristics generated by the spot characteristic generator circuit 322, moreover, as plotted in the example in FIG. 12, are such that a characteristic curve is formed by joining the light intensity characteristic values at characteristic points a to p within the range of the fade region (penumbra scale). By fade region (penumbra scale) here is meant that region from the spot characteristic attenuation starting point within the range of the angle 62 indicated in FIG. 11 to the point (cutoff) where the spot illumination effect becomes zero.

In FIG. 12, the light intensity of the spot light source O in the direction of the light axis vector is taken as 1, the angles subtended between the light axis vectors D and the vectors extending toward the pixels corresponding to the characteristic points a to p are plotted on the horizontal axis, spot characteristic values are plotted on the vertical axis, and the values of normalizing each point to a light intensity of 1 are plotted.

The spot characteristic generator circuit 322 according to the present invention, as diagrammed in FIG. 8, comprises a table 8 which accommodates light intensity values for the spot characteristic points a to p noted above, an address generator 9 for generating read addresses for the light intensity values for the characteristic points a to p from the table 8, and an interpolator 10 for one-dimensionally interpolating between characteristic points.

The spot characteristic table 8 of the spot characteristic generator circuit 322 diagrammed in FIG. 8 comprises a first bank 80 and a second bank 81, as an embodiment. An example configuration for the address generator 9 is diagrammed in FIG. 10.

To the address generator 9 are input pixel information L (light source vectors Lx, Ly, Lz) and coefficient data (spot axis direction vectors "Dx, Dy, Dz," cutoff angles "Cutoff," fade-width normalization coefficients "Penumbra-scale," and indexes "table-id" for selecting the characteristic table 8).

Figure 10:
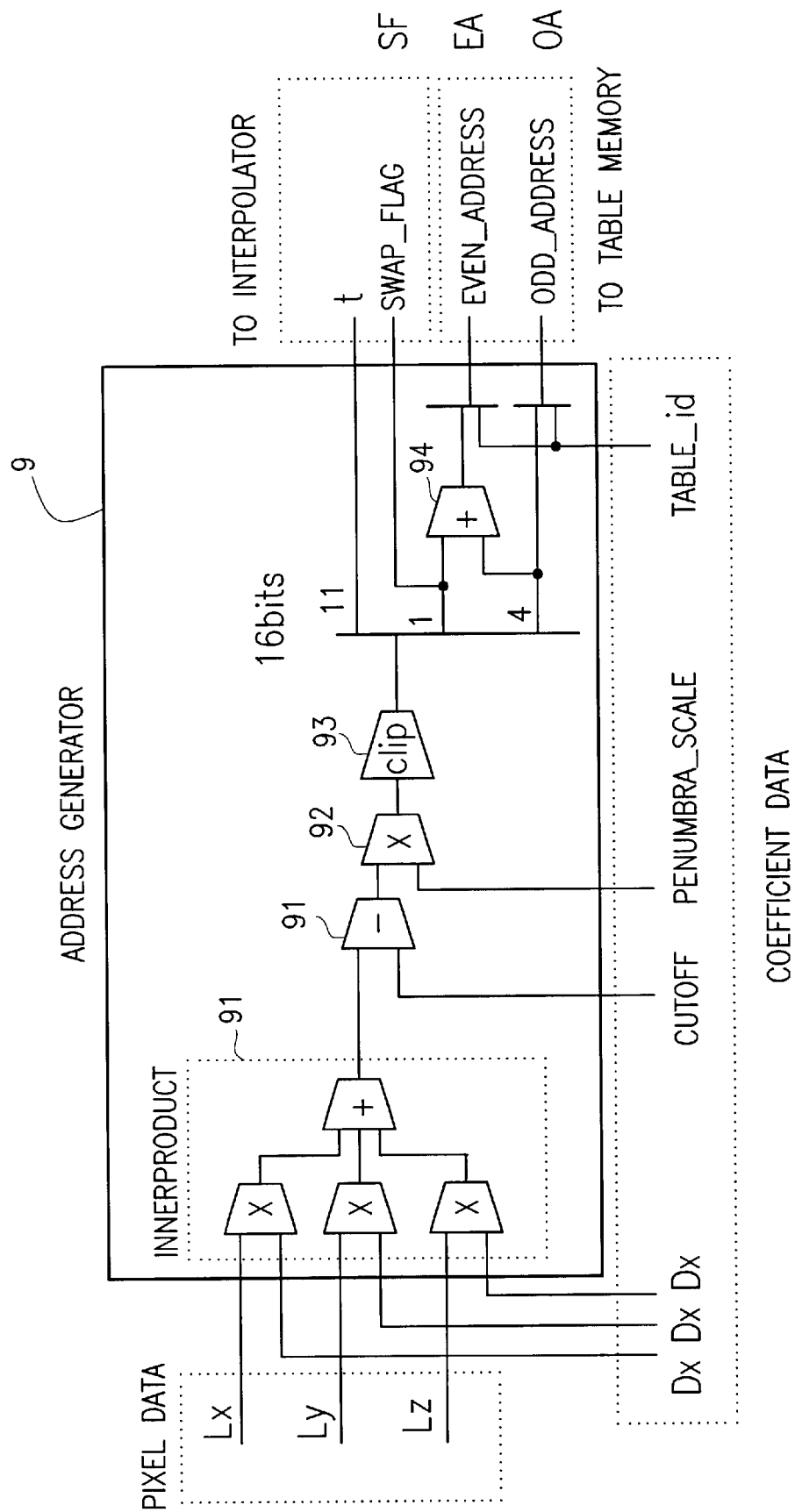
FIG. 10 is a block diagram of an example configuration of an address generator.

In FIG. 10, the inner product 60 (cf. FIG. 11) between the light source vector Lx, Ly, Lz, and the spot axis direction vector Dx, Dy, Dz is found, by an inner product computation unit 90, and the value of the cosine produced by these two vectors is determined. Portions that exceed the cutoff part 61 (cf. FIG. 11) are deleted by a subtractor 91.

Next, the output of the subtractor 91 that has deleted the portions exceeding the cutoff part 61 is multiplied by a fade-width normalizing coefficient "Penumbra-scale," for example by a coefficient of 10, and the portion applying to the penumbral part (fade part) 62 (cf. FIG. 11) is normalized to from 0.1 to 1.0. Accordingly, when the input exceeds 1.0, it is clipped to 1.0, and when it is 0.0, it is clipped to 0.0, by a clipping arithmetical unit 93.

The output from the clipping arithmetical unit 93 is used in accessing the characteristic table 8 and in interpolating between characteristic points. Assuming here that the output of the clipping arithmetical unit is a 16-bit output, then 4 bits can be used for accessing the characteristic table 8, 1 bit for the bank switchover flag SF, and 11 bits for interpolating between characteristic points.

Here, in the embodiment diagrammed in FIG. 8, the characteristic table 8 comprises first and second memory banks 80 and 81. Accordingly, in the characteristic diagram in FIG. 12, the adjacent characteristic value data for the characteristic points a to p are stored alternately in the first memory bank 80 and second memory bank 81, respectively. Being configured in this way, it is possible to read out adjacent characteristic value data simultaneously, and therefore to shorten memory access time.

Furthermore, when the bank switchover flag SF is 0, the read-out address (odd address) OA for the first memory bank 80 and the read-out address (even address) EA for the second memory bank 81 are the same. When the bank switchover flag SF is 1, on the other hand, the read-out address (even address) EA for the second memory bank 81 is advanced by 1, by an incrementing circuit 94, relative to the read-out address (odd address) OA for the first memory bank 80.

To describe this in terms of specific examples, when the bank read-out switchover flag SF is 0, and the address is 0000, the read-out address EA for the first memory bank 80 is the same as the read-out address OA for the second memory bank 81, whereupon the characteristic point a data are read out from the first memory bank 80 and the characteristic point b data are read out from the second memory bank 81.

In this case, the interpolator 10 in FIG. 8 inputs an interpolation parameter t and the logical 0 of the bank read-out switchover flag SF. In addition, data for the characteristic points a and b read out from the characteristic tables 80 and 81 are input.

Accordingly, the interpolator 10 finds the value between the characteristic points a and b by one-dimensional interpolation from the relationship expressed by Equation 3 below.

$$D_{t\ a-b} = tA + (1-t)B \quad (3)$$

In Equation 3 above, Dta-b is the spot effect value for the interpolation parameter t point between the characteristic points a and b, A is the spot effect value for the characteristic point a, and B is the spot effect value for the characteristic point b.

In the specific example noted in the foregoing, when the bank read-out switchover flag SF is a logical 1, the first characteristic table 80 read-out address is advanced by 1 by the incrementing circuit 94, resulting in an address of 0001. At this address the data for the characteristic point c are stored.

In this case, in the interpolator 10, the bank read-out switchover flag SF is a logical 1, wherefore the characteristic point b read out from the characteristic table 81 is given priority, and the interpolation data Dtb-c between the characteristic points b and c are found from Equation 4 below.

$$D_{t\ b-c} = tB + (1-t)C \quad (4)$$

As noted above, by means of the present invention, it is possible to form spot characteristics using simple arithmetic operations.

In addition, by configuring the characteristic point data stored in the characteristic table 8 as desired, any desired spot characteristics can be formed. In other words, by configuring characteristic point data as exponential powers, Open GL (trademark) spot characteristics can be approximated, and by configuring these linearly, Softimage spot characteristics can be approximated.

Figure 13:
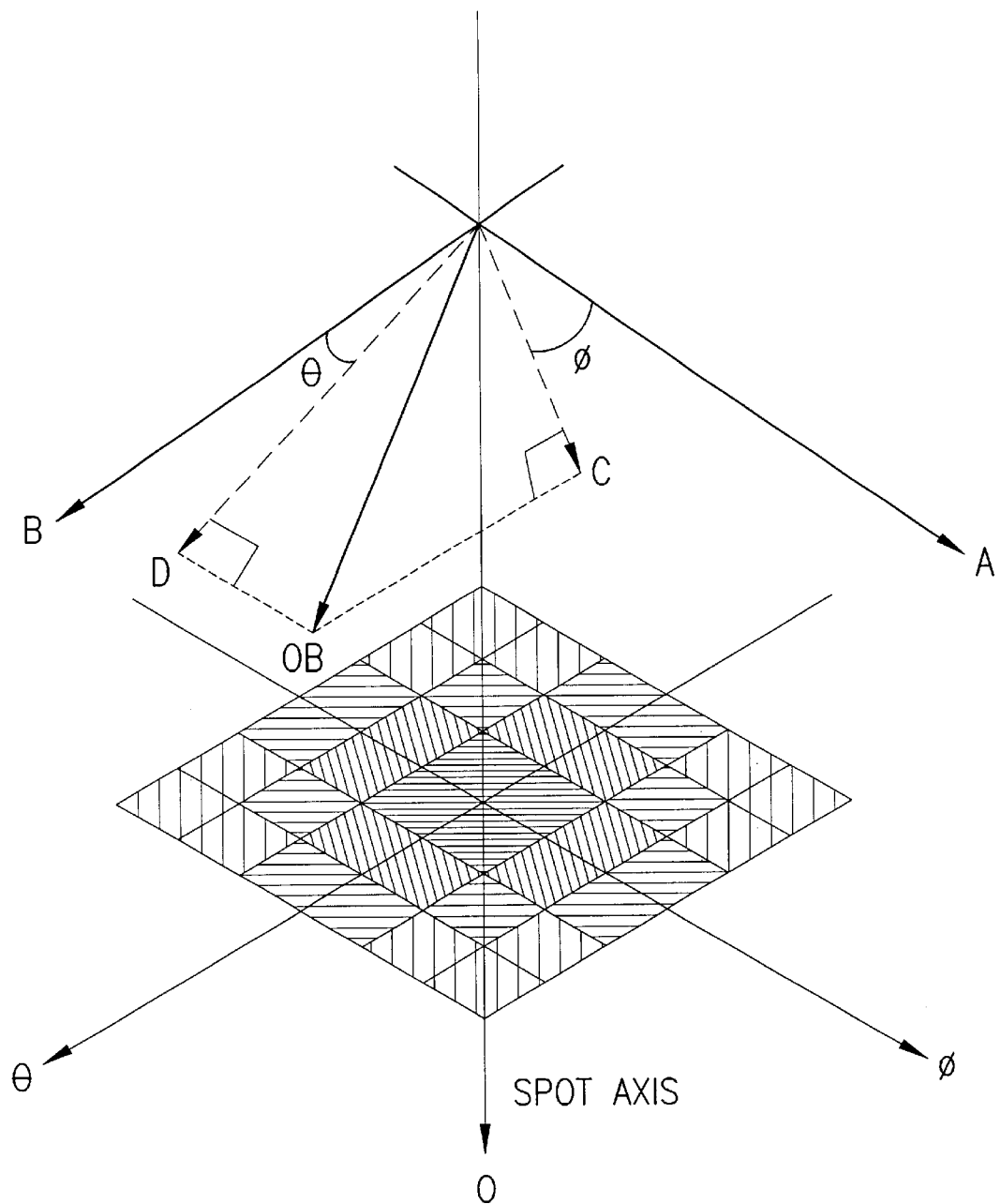
FIG. 13 is a diagram for describing another embodiment of the present invention.

FIG. 13 is a diagram for describing another embodiment of the present invention. In the embodiment described in the foregoing, the spot characteristics are found in terms of an angle with some axis, so the spot always becomes circular. In the example represented in FIG. 12, only a spotlight effect based on concentric circular spotlight characteristics can be expressed. In other words, only one-dimensional spotlight characteristics can be generated.

In the embodiment diagrammed in FIG. 13, however, the number of axes is increased further, and it is possible to hold two-dimensional characteristic point data in the characteristic table 8. With this configuration, the spot characteristics produce spots having two-dimensional characteristics.

In the specific example diagrammed in FIG. 13, axes A and B perpendicular to a spotlight axis O are defined, making it possible to consider an OA plane and an OB plane defined by the spotlight axis and the A and B axes. Thereupon, a two-dimensional table is referenced, using the angles 104 and θ subtended between the axes A and B, respectively, and the orthogonal projections C and D of the light vector OB relative to the OA plane and OB plane, respectively. Thus it is possible to obtain two-dimensional characteristic spot characteristics. It is also possible, similarly, to define a plurality of axes that are perpendicular to the spot axis O.

Figure 14:
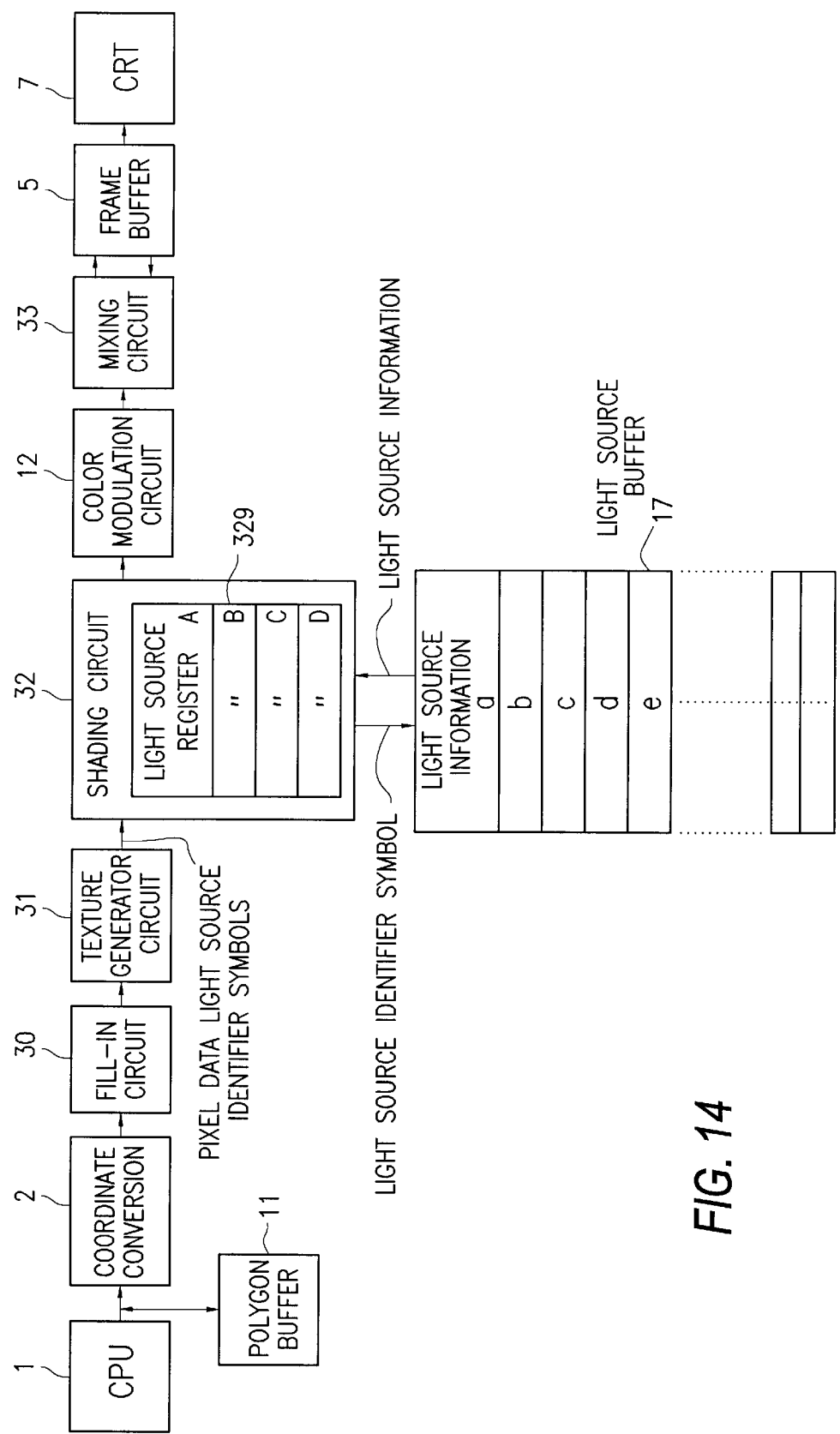
FIG. 14 is a block diagram of a first example configuration of an image processing system of the present invention.

Next is described an embodiment of an image processing system wherein the spot light source characteristic forming method of the present invention, described in the foregoing, is employed. In this embodiment of the present invention, there are multiple groups of light sources, and light source identifier symbols (hereinafter called "Light-IDs") that indicate which light source group is used for each polygon. The shading circuit reads out the effective light source information based on the Light-ID, and performs shading according thereto. FIG. 14 is a block diagram of a first example configuration of an image processing system that employs the light source characteristic forming method of the present invention.

The CPU 1 is for controlling the execution of programs for processing images using polygons. The CPU 1 temporarily stores apex data for polygons to be displayed on the CRT display monitor 7 and register setting functions in the polygon buffer 11, following the advance of the program. The CPU 1 also applies a Light-ID to each polygon as information determinative of which light source each polygon is affected by.

Data read out from the polygon buffer 11 are input to the coordinate converter 2. The coordinate converter 2 converts the input data to two-dimensional coordinates in order to display polygons placed in three-dimensional space on the CRT display monitor 7, as the program is being executed. The polygon data coordinate-converted to two-dimensional coordinates are sent to the fill-in circuit 30 and the texture generator circuit 31.

The fill-in circuit 30 computes information for pixels within a range that is enclosed by the polygon apexes. The computations for the filling in noted above are such as, for example, linear interpolations based on information on two apexes corresponding to information on apexes between polygon apexes. The fill-in circuit 4, furthermore, writes the Light-IDs attached to each polygon to the pixels configuring the polygons. This writing operation is repeated a number of times equal to the number of polygons.

The texture generator circuit 31 reads out texture (not shown) corresponding to the pixels from the texture buffer, and computes colors for each pixel. The output from the texture generator circuit 31 is sent as pixel data to the shading circuit 32, while, concurrently, corresponding polygon Light-IDs are attached by the fill-in circuit 30 to the pixels making up the polygons. The shading circuit 32, based on these Light-IDs, performs shading processing for light sources which affect each of the pixels configuring the polygons.

In the example configuration diagrammed in FIG. 14, there are four light source registers 329 inside the shading circuit 32, designated A, B, C, and D, in a case where the number of light sources that can be processed by the shading circuit 32 for one image scene is four. In these four light source registers 329 are stored information on light sources which affect the polygons.

In the light source buffer 17, meanwhile, is stored information on all of the light sources. This light source information is designated in four units by the Light-ID, which are stored in the light source registers 329 in the shading circuit 32. In this case, a Light-ID is attached to each of the pixels in the image scene, wherefore the shading processing for the pixels is done only for the four light sources designated by the Light-ID. The shading circuit 32, furthermore, based on the light source information in the light source registers 329, computes pixel illumination effects based on the polygon apex data. The details and functions of this shading circuit 32 are described subsequently.

The output of the shading circuit 32 is sent to the color modulation circuit 12 and the mixing circuit 33. The color modulation circuit 12 is a circuit that modulates colors for each pixel, based on the output from the shading circuit 32. The mixing circuit 33 mixes the color information for the polygon pixels previously drawn, and read in from the frame buffer 5, together with color information for newly processed polygon pixels, and writes this information as one screen of data to the frame buffer 5. The information in this frame buffer 11 is displayed on the CRT display monitor 7.

Figure 15:
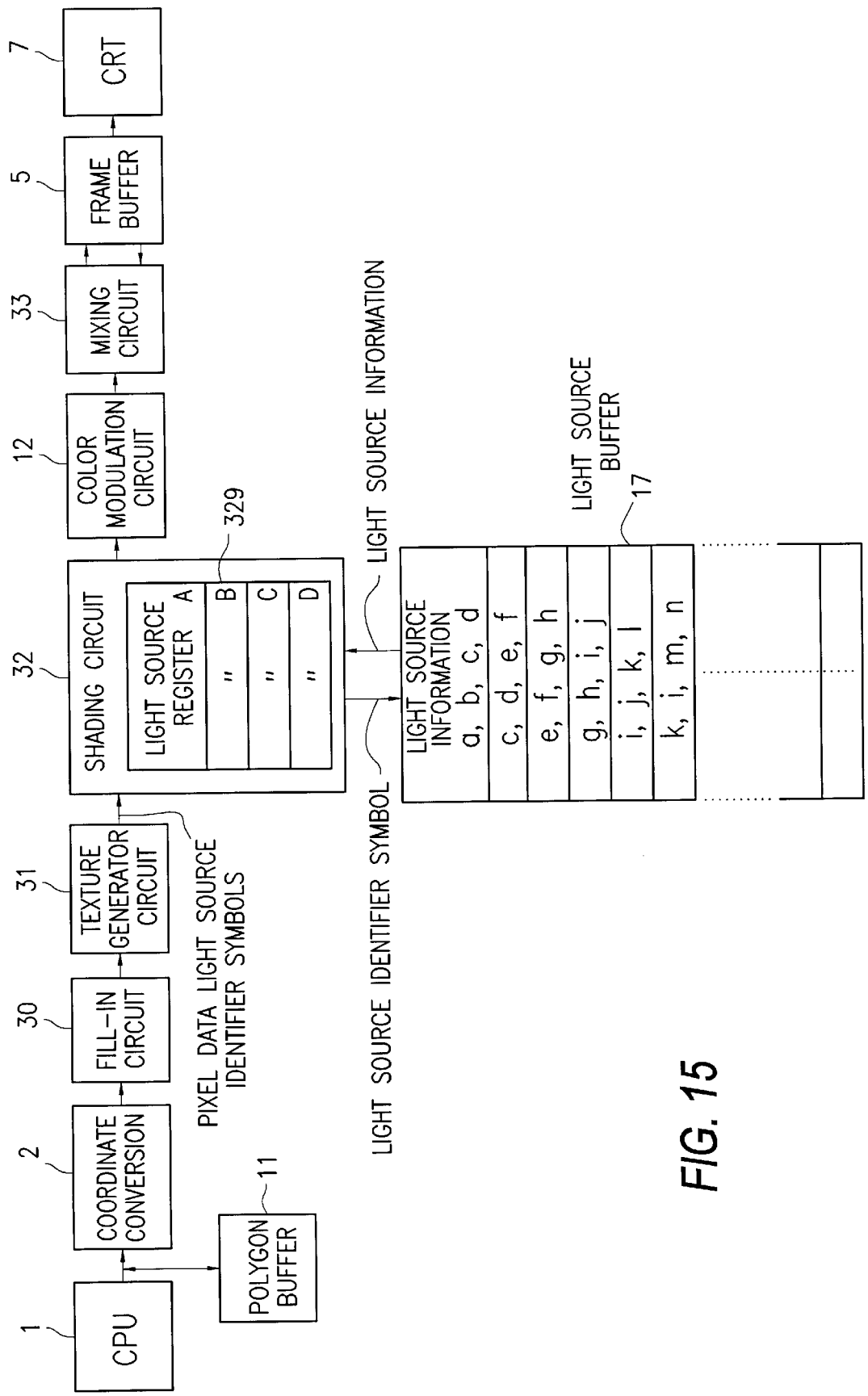
FIG. 15 is a block diagram of a second example configuration of an image processing system of the present invention.

FIG. 15 is a block diagram of a second example configuration of an image processing system in which the present invention is employed. In the light source buffer 17 in FIG. 15, a plurality of light source information units is stored, taking the number of light sources that can be processed in one image scene, that is, the number of light source registers 329, as one group. When this is the case, one Light-ID is attached to each pixel, and the shading circuit 6, based on this Light-ID, can read out light source information from the light source buffer 17, taking four light sources as one group in the embodiment.

Figure 16:
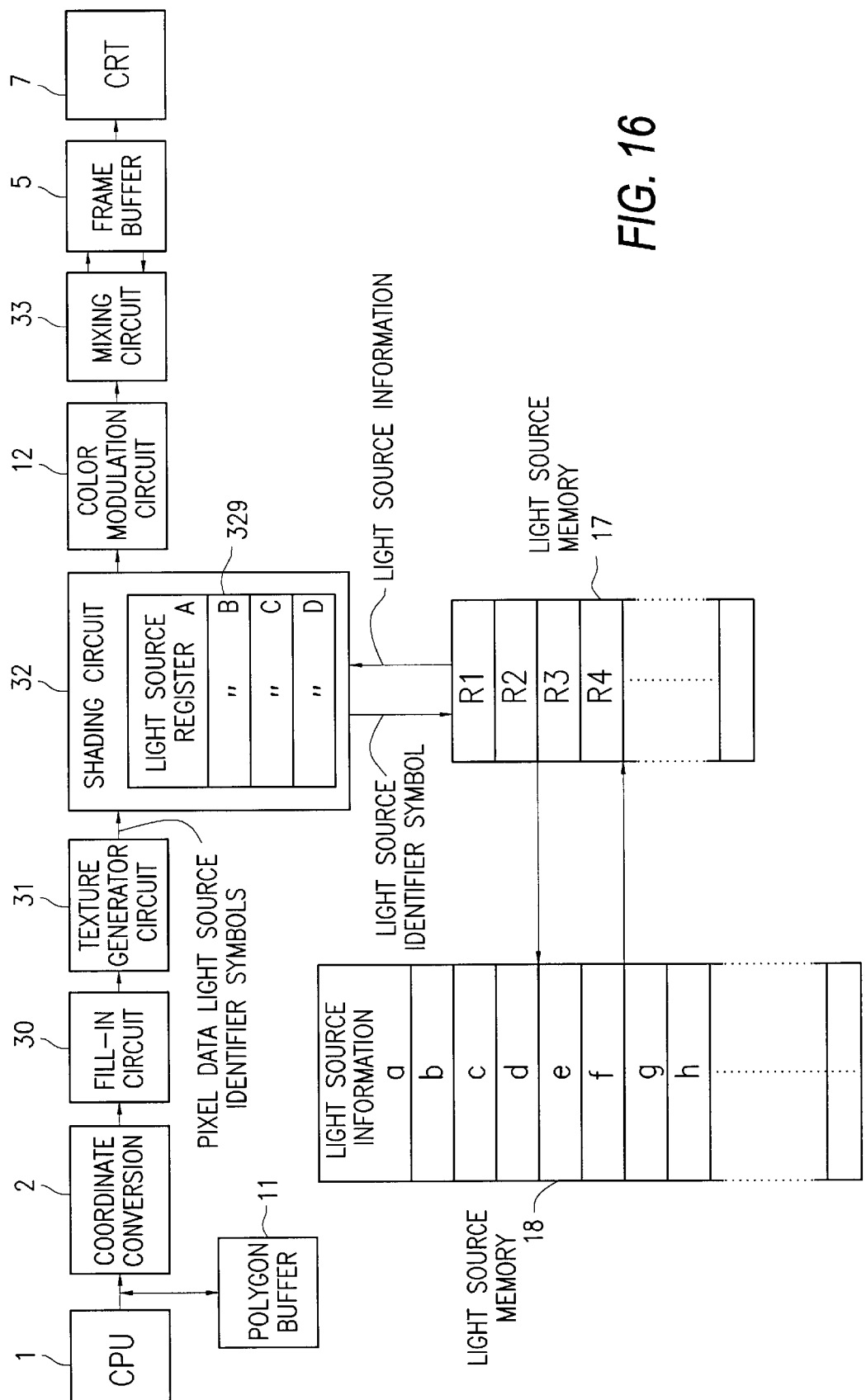
FIG. 16 is a block diagram of a third example configuration of an image processing system of the present invention.

FIG. 16 is a block diagram of a third example configuration of an image processing system wherein the present invention is employed. In this example configuration, information on all of the light sources used is stored in the light source memory 8, and in the light source buffer 17 is stored information for a group of light sources that have an effect on each pixel. One Light-ID is attached to each pixel. The shading circuit 32, based on that Light-ID, can recognize the group of light sources from the light source buffer 17 that have an effect on the pixel, and can read out information of the light sources from the light source memory 18.

FIG. 17 diagrams one example of the content of the light source buffer 17 in the third example configuration of the image processing system diagrammed in FIG. 16. In this case, the Light-ID for each pixel is given as a 6-bit address. In that address in the light source buffer 17 is stored information on a number of light sources that is the number of light source registers, as light sources having an effect on each pixel, for example, on a group of light sources where four make one group.

The Light-IDs are provided by the CPU 1, following the course of the game program, as information on which four light sources a polygon is to be affected by. The light sources so designated will usually be light sources that are either near the polygon or of strong intensity.

For this reason, as diagrammed in FIG. 17, when a Light-ID (000001) has been attached to some polygon, that polygon and the pixels contained in that polygon are subjected to shading processing as being influenced by the light sources c, d, e, and f.

Accordingly, if a 6-bit address is used, 64 light source group combinations are possible, and the number of apparent light sources can be increased even though the number of light sources that can be processed in terms of hardware is four.

Figure 18:
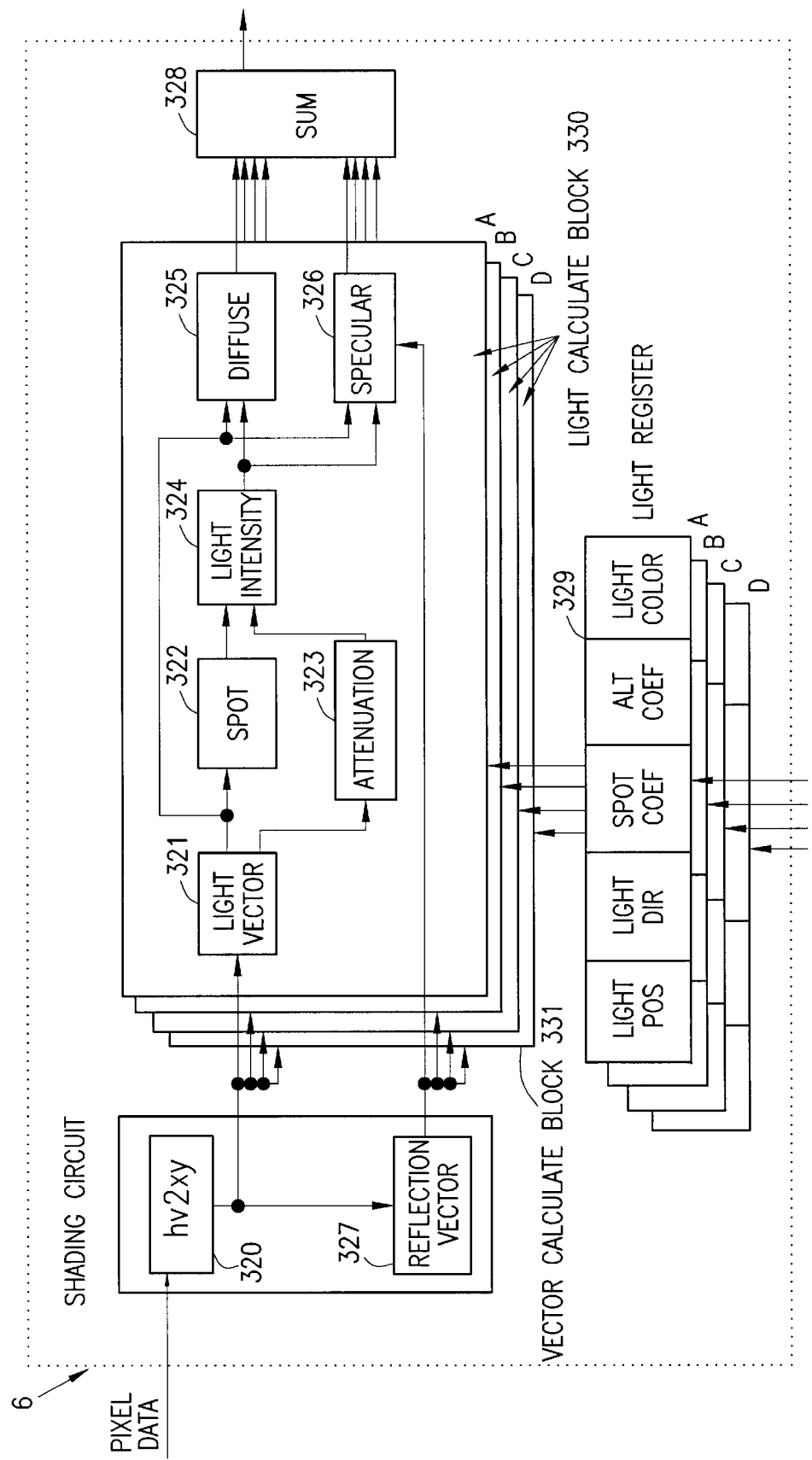
FIG. 18 is a block diagram of an embodiment configuration of a shading circuit employing the present invention.

Next will be described a light source characteristic forming method implemented in the shading circuit 32 in an image processing system having the configuration described in the foregoing, together with an embodiment of the shading circuit 32. FIG. 18 is a block diagram of an embodiment of the shading circuit 32 wherein the present invention is employed.

The shading circuit 32 is a circuit that computes how the pixels contained in the polygons are influenced by the light sources. In this embodiment, the shading circuit 32 comprises four blocks, namely a vector arithmetical unit 331, light source arithmetical units 330, light source registers 329, and accumulator 328. In this embodiment, so that the effects from four light sources can be processed at one time, the light source registers 329 for storing light source information and the light source arithmetical units 330 that compute shading for the pixels are provided, respectively, in four sets. Data for four light sources, as described in connection with FIG. 14 to 17 earlier, are stored in the light source registers 329A, B, C, and D, respectively.

Accordingly, the effects made by four light sources on each pixel are computed by the light source arithmetical units 330A, B, C, and D corresponding to the light sources, respectively, and the effects from the four light sources on the pixels are combined by the accumulator 328. The light source data stored in the light source registers 329 are used in the light source arithmetical units 330 when generating spot characteristics or processing light source attenuation.

Next is explained the operation of each of the sub-circuits contained in the shading circuit 32. The vector arithmetical unit 331 comprises a coordinate inverter 320 and a reflection vector circuit 327. The coordinate inverter 320 is a circuit that converts input two-dimensional coordinate pixel data to three-dimensional coordinate pixel data. The output from the coordinate inverter circuit 320, in this embodiment, is input to the four light source arithmetical units 330 (A, B, C, D), whereupon the effects from the four light sources are computed at one time. The other output from the coordinate inverter circuit 320 is input by the reflection vector circuit 327. The data converted to three-dimensional coordinate data by the coordinate inverter circuit 320 and input by one of the light source arithmetical units 330, say A, for example, are input by the light vector circuit 321.

The light vector circuit 321 determines light vectors that extend from light sources toward pixels, based on the positions of those light sources in virtual three-dimensional space and the three-dimensional coordinates of those pixels. This circuit also determines data on distances between light sources and the pixels at issue.

The light vectors so determined are input to the spot characteristic generator circuit 322. The data on distances found between light sources and the pixels at issue are input to the attenuation processing circuit 323. In this attenuation processing circuit 323 are determined the spot effect characteristics represented as an example in FIG. 12 by the light source O having the axis vector 70, as diagrammed in FIG. 11. The spot characteristic generator circuit 322 determines the inner product 60 between the spot light source axis vector 70 and the light vector input for each pixel, that is, the cosine therefor, and outputs the intensity of light generated from the spot light source toward the pixel.

Meanwhile, the attenuation processing circuit 323 computes the amount of light attenuation according to the distance between the spot light source O and the pixel at issue. Next, based on the light intensity generated toward the pixel by the spot light source, from the spot characteristic generator circuit 322, and the amount of light attenuation resulting from the distance from the spot light source to the pixel at issue, from the attenuation processing circuit 323, the light intensity for the pixel at issue is determined, from the light intensity synthesizing circuit 324.

In other words, the light intensity for each pixel is determined from the intensity exhibited by the light source itself, the amount of attenuation resulting from the angle subtended by the spot light source axis vector 70 and the light vector for the pixel at issue, and the amount of attenuation resulting from the distance from the spot light source to the position of the pixel at issue.

Based on the light intensity for each pixel, as determined by the light intensity synthesizing circuit 324, next, shading effects are imparted to each pixel. These shading effects include a diffuse reflection effect and a mirror reflection effect.

The diffuse reflection effect is so-called irregular reflection, produced by light that penetrates the surface of an object, is absorbed, and is again radiated. This diffuse reflected light radiates evenly in all directions. For this reason, it bears no relation to the viewpoint of an observer. What is important is the angle subtended between the direction from the light source toward the pixel at issue, and the direction of the normal of the surface of the pixel at issue. When this angle exceeds $\pi/2$, the light source enters the shadow of the object and diffuse light reflection does not occur.

The mirror reflection effect, on the other hand, produces an effect wherein, with a perfect reflecting surface, the angle of the reflected light relative to the incident light becomes the same relative to the normal.

Accordingly, the mirror reflection effect can only be observed by an observer who is at an angle which coincides with the angle of the reflected light. For this reason, in order to find the size of the reflected light, the observer's line-of-sight reflection vector is needed.

The mirror reflection circuit 326 inputs light intensities for vectors determined by the light intensity synthesizing circuit 324, whereupon it determines and outputs incident angles at the pixels at issue and reflection quantities from line-of-sight vectors obtained from a reflection vector circuit 327.

The diffuse light quantities from the diffusion circuit 325 noted earlier, and the mirror reflection light quantities from the mirror reflection circuit 326 are synthesized in the accumulator 328, together with the output from the other light source arithmetical units 330 B, C, and D, and output.

Figure 19:
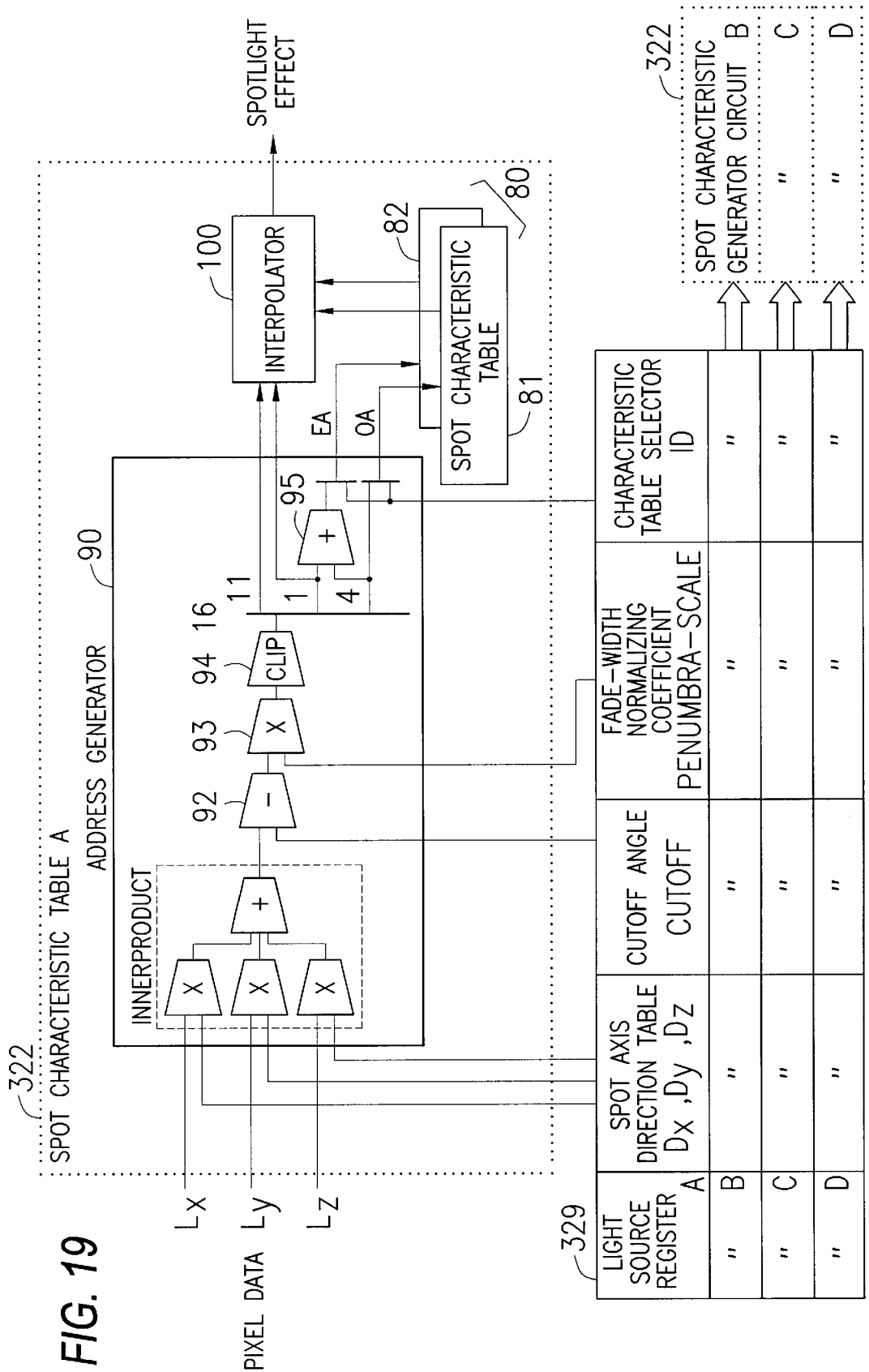
FIG. 19 is a block diagram of an example configuration of a spot characteristic generation circuit and light source register following the present invention.

In FIG. 19 is given a block diagram of an example configuration of the spot characteristic generator circuit 322 employed in the shading circuit 32 configured as described in the foregoing. In this example configuration, by means of a method wherein a table is employed, as will be described below, it is possible to form any desired spot characteristics from the data stored in the table, without requiring complex computations. It should be noted that the spot characteristic generator circuits A, B, C, and D have the same configuration, so the description given focuses on the spot characteristic generator circuit A.

The spot characteristics generated by the spot characteristic generator circuit 322, as plotted in the example in FIG. 12, are such that a characteristic curve is formed by joining the light intensity characteristic values at characteristic points a to p within the range of the fade region (penumbra scale) 62 (cf. FIG. 12).

More specifically, in FIG. 12, taking the light intensity in the direction of the light axis vector of the spot light beam O as 1, the angle subtended between the light axis vector D and the vector L in the direction of the pixel corresponding to the characteristic points a to p is plotted on the horizontal axis, and the normalized value for the light intensity of 1 at each point is plotted on the vertical axis.

The spot characteristic generator circuit 322 in this example configuration, as diagrammed in FIG. 19, comprises a table 80 for storing the light intensity values for the characteristic points a to p for the spot characteristics noted above, an address generator 90 for generating addresses for reading out light intensity values for the characteristic points a to p from the table 80, and an interpolator 100 for performing one-dimensional interpolation between the characteristic points.

To the address generator 90 are input pixel data (Lx, Ly, Lz) as pixel information, spot axis direction vectors (Dx, Dy, Dz) as light source information, a cutoff angle (Cutoff), fade width normalization coefficients (Penumbra-scales), and indexes (table-ids) for selecting the characteristic table 80.

These light source information units, moreover, are stored for each light source a, b, c, . . . , in either the light source buffer 17 noted in FIG. 14 and 15 or the light source memory 18 noted in FIG. 16. In this embodiment example, the effects of four light sources on each pixel can be processed, and to each pixel is imparted a Light-ID for designating the four light sources, by the CPU 1 noted in FIG. 14, etc. The light source registers 329 are four, namely A, B, C, and D, four light source data units are read in from either the light source buffer 7 or the light source memory 8, according to the Light-ID, and light source data are supplied to the spot characteristic generator circuits 322 (A, B, C, D).

In FIG. 19, the inner product 60 (cf. FIG. 11) between the pixel data Lx, Ly, Lz and the spot axis direction vector Dx, Dy, Dz is found, and the value of the cosine [of the angle] subtended by these two vectors is determined. The portion exceeding the cutoff part 61 (cf. FIG. 11) is deleted by a subtractor 92.

Next, the output from the subtractor 92 that has deleted the portion exceeding the cutoff part 61 is multiplied by the fade-width normalizing integer Penumbra-scale, that is, by a coefficient of 10, for example, by a multiplier 93, and the part applicable to the penumbral part (fade part) 62 (cf. FIG. 11) is normalized to a value ranging from 0.0 to 1.0. Accordingly, when the input is above 1.0, it will be clipped to 1.0, and when less than 0.0, it will be clipped to 0.0, by a clipping arithmetical unit 94.

The output from the clipping arithmetical unit 94 is used both for accessing the characteristic table 80 and in interpolating between characteristic points. If we assume here that the output of the clipping arithmetical unit 94 is a 16-bit output, then 4 bits thereof are used to access the characteristic table 80, 1 bit is used as the bank switchover flag SF, and 11 bits are used in characteristic point interpolation.

Here, in the embodiment diagrammed in FIG. 19, the characteristic table 80 comprises a first and second memory bank 81 and 82. Accordingly, in the characteristic diagram in FIG. 12, the data on the characteristic points a to p are alternately held in the first memory bank 81 and the second memory bank 82, respectively.

When the bank switchover flag SF is 0, moreover, the read-out address (odd address) OA for the first memory bank 81 and the read-out address (even address) EA for the second memory bank 82 are the same. When the bank switchover flag SF is 1, on the other hand, the read-out address (even address) EA for the second memory bank 82 is advanced by 1, by an incrementing circuit 94, relative to the read-out address (odd address) OA for the first memory bank 81.

A specific example is the same as described earlier. When the bank read-out switchover flag SF is 0, and the address is 0000, the read-out address EA for the first memory bank 81 is the same as the read-out address OA for the second memory bank 82, whereupon the characteristic point a data are read out from the first memory bank 81 and the characteristic point b data are read out from the second memory bank 82.

In this case, the interpolator 100 in FIG. 19 inputs an interpolation parameter t and the logical 0 of the bank read-out switchover flag SF. In addition, data for the characteristic points a and b read out from the characteristic tables 81 and 82 are input.

Accordingly, the interpolator 100 finds the value Dta-b between the characteristic points a and b by one-dimensional interpolation from the relationship expressed by Equation 3 above.

In the specific example described above, when the bank read-out switchover flag SF goes to logical 1, the read-out address of the first characteristic table 81 is advanced by 1, by the incrementing circuit 95, so the address becomes 0001. In this address are stored characteristic point c data.

In such a case as this, in the interpolator 100, the bank read-out switchover flag SF is at logical 1, wherefore the characteristic point b read out from the characteristic table 82 is given priority, and the interpolated data Dtb-c between the characteristic points b and c are found by Equation 4 above.

In the manner described above, therefore, it is possible to form spot characteristics by simple arithmetical operations. And by configuring the characteristic point data held in the characteristic table 80 as desired, any desired spot characteristics can be formed.

Figure 20:
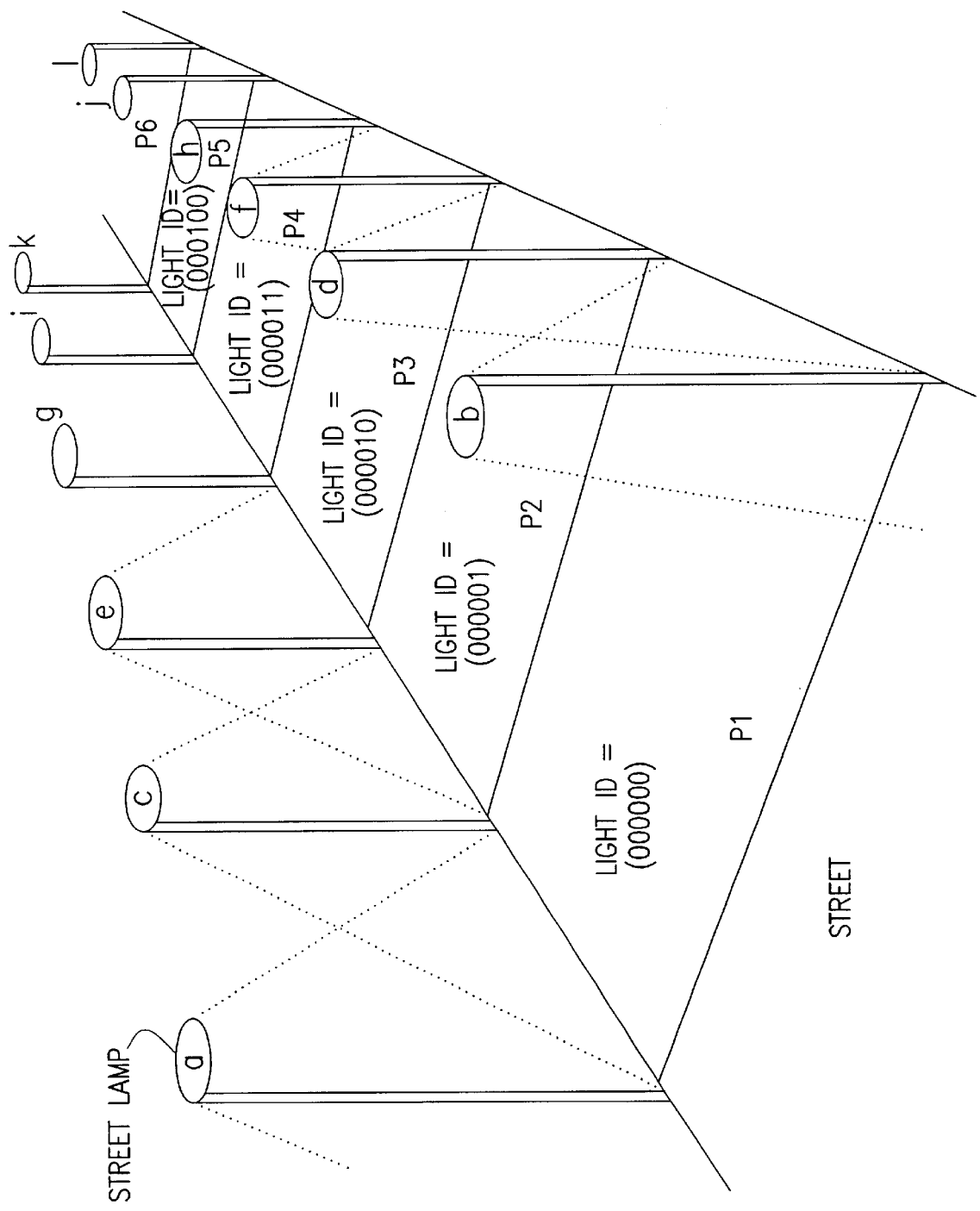
FIG. 20 is a diagram for describing an illumination effect based on a spot light source having an axis vector.

Next, a working example is diagrammed in FIG. 20 of an image scene wherein a street is illuminated by a plurality of street lamps, according to the present invention. Light sources a, b, c, etc. are positioned on both sides of the street. To the polygons forming the street are attached Light-IDs that indicate from which light sources effects are encountered. In this example, one polygon can be affected by a maximum of four light sources. In the case where the Light-ID for the polygon P2 is 000001, for example, that polygon will be affected by the light sources c, d, e, and f, according to the contents of the light source buffer diagrammed in FIG. 17.

Thus if each polygon holds an ID indicating which light sources affect it, and light source processing is performed correspondingly, a number of light sources greater than the umber of light sources that can be processed simultaneously will be effected in the scene.

Figure 21:
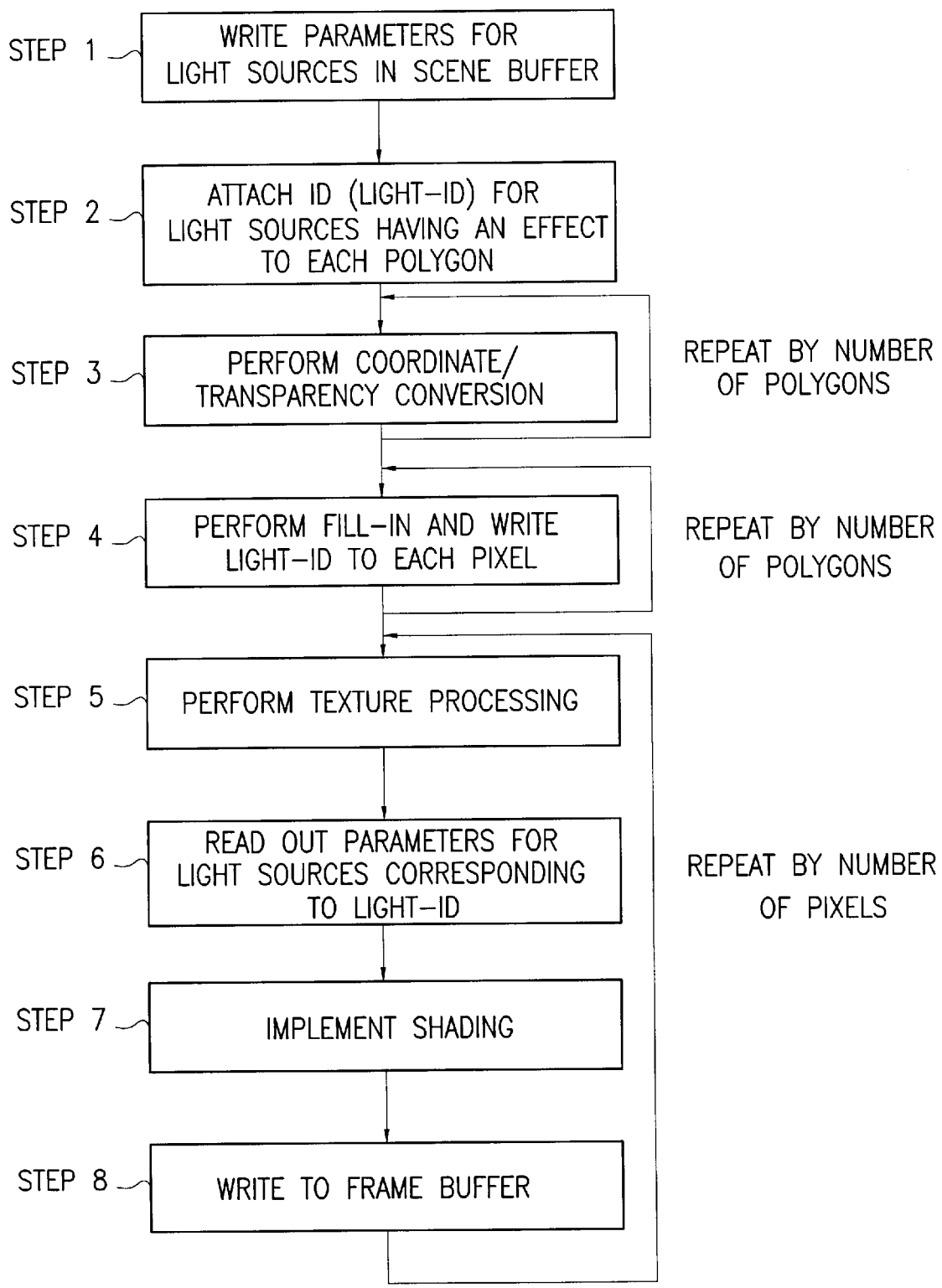
FIG. 21 is a process flowchart for an aspect of the present invention.

The processing flow for the present invention is diagrammed in FIG. 21. In the processing at the program initialization sate, the step 1 and step 2 routines are performed. First, the light source parameters in the scene are written to the light source buffer 17 (step 1). The light source parameters include light source position, color, intensity, and direction, etc. The scene may be made to contain whatever number of light sources is allowed by the light source buffer 17.

Next, light source IDs (Light-IDs) are attached to each polygon to indicate the light sources having an effect on them (step 2). Each polygon usually is most strongly affected by the light source nearest it. In systems wherein the hardware permits the simultaneous processing of four light sources, it is possible to apply addresses in the light source buffer that designate four light sources which are the closest to each polygon. As to the light sources that affect a polygon, these light sources can be selected on the basis of the direction of the apex normal vectors for the polygon and the direction in which the light source is oriented.

Then, in step 3, coordinate conversions and transparency conversions are repeated a number of times equal to the number of polygons, for each polygon in each scene, as the game progresses (step 3). With this processing done in step 3, three-dimensional polygons are converted to two-dimensional data on the screen, and, by transparency conversion, processing can be done to change the sense of depth associated with changes in the position of the visual point.

Next, each polygon is filled in, and a Light-ID is written in for each pixel (step 4). Accordingly, in this step 4, four light sources will be designated as those which have an effect on a pixel, from among the many light sources in the scene. Then, in step 5, texture generation is performed (step 5). Such texture includes polygon surface patterns and material feel. Such patterns, etc., are applied to the polygon surface by mapping.

Next, according to a characteristic of the present invention, light source parameters corresponding to the Light-IDs are read out from the light source buffer 17 (step 6). In other words, when the Light-ID is in an address in the light source buffer 17, based on that address, light source information stored in the light source memory 18 is read out.

Shading processing is next performed (step 7). In this shading processing, based on the light sources and the data on the object polygons, screen illumination, coloring, and shadowing processes are performed. Then one screen of video data is written into the frame buffer 5 (step 8). Such processing routines from step 5 to step 8 are repeated a number of times equal to the number of pixels forming the polygon, and one screen of information stored in the frame buffer 5 is displayed on the CRT display monitor 7.

According to the embodiments described in the foregoing with reference to the drawings, with the method of spotlight characteristic formation according to the present invention, a characteristic table wherein characteristic point data are stored in advance is referenced, using angles subtended between spot axes and light source vectors, thereby making it possible to form spot characteristics with a high degree of freedom with simpler circuitry as compared to methods that determine spot characteristics for each pixel based on computation equations.

Furthermore, a high degree of freedom is realized in the spot characteristics, and the effecting circuitry is also simple. Furthermore, if the characteristic table prepared is extended to two dimensions, it is also possible to form non-circular spots or to form a plurality of spots from one light source. As described in the foregoing, according to the present invention, a plurality of light source groups can be handled and selected by the Light-IDs, whereby it is possible to use a number of light sources greater than the number of light sources that can be used simultaneously, in a scene.

What is claimed is:

1. A method for forming spotlight characteristics imparted to pixels configuring polygons comprising the steps of:
   storing multiple characteristic values corresponding to a prescribed spotlight characteristic curve in a table; and
   forming said spotlight characteristic curve from characteristic values read out from said table or from interpolated values found by interpolating between mutually adjacent characteristic values read out from said table.

2. A method of forming spotlight characteristics imparted to pixels configuring polygons comprising the steps of:
   storing multiple characteristic values corresponding to a prescribed spotlight characteristic curve in a table;
   reading out characteristic values from addresses in said table corresponding to inner products between spotlight light axis vectors and light vectors extending either from a light source toward pixels or from pixels toward a light source; and
   forming said spotlight characteristic curve from characteristic values read out from said table or from interpolated values found by interpolating between mutually adjacent characteristic values read out from said table.

3. The spotlight characteristic forming method according to claim 2, wherein:

from among the inner products between said light axis vectors and said light vectors, inner products with light vectors pertaining to pixels within spotlight fade regions are normalized, and characteristic values are read out from addresses in said table corresponding to said normalized inner products.

4. A method of forming spotlight characteristics imparted to pixels configuring polygons wherein:

storing multiple characteristic values corresponding to a prescribed spotlight characteristic curve in a table;

defining a spotlight light axis vector and at least two axes perpendicular to said spotlight light axis vector;

reading out characteristic values from said table corresponding to angles subtended between at least two planes defined by said spotlight light axis vector and at least two axes perpendicular thereto, respectively, on the one hand, and orthogonal projections for said at least two planes of light vectors extending either from a light source toward pixels or from pixels toward a light source toward pixels, on the other; and forming said spotlight characteristic curve from said characteristic values so read out or from interpolated values between mutually adjacent characteristic values read out from said table.

5. An image processing system including:

a spotlight characteristic forming unit for imparting spotlight illumination effects to displayed polygons; wherein:

said spotlight characteristic forming unit comprises:

a table for holding a plurality of characteristic values corresponding to a prescribed spotlight characteristic curve;

an address generator circuit for generating addresses for reading out characteristic values from said table; and an interpolator for finding interpolated values between mutually adjacent characteristic values read out from said table and corresponding to said addresses; and said spotlight characteristic curve is formed from characteristic values read out from said table or from interpolated values found by said interpolator.

6. The image processing system according to claim 5, wherein:

said address generator circuit includes a circuit for finding inner products between spotlight light axis vectors and light vectors extending either from a light source toward a pixel or from a pixel toward a light source, and addresses in said table are output from which characteristic values are read out corresponding to values of inner products found by said circuit for finding inner products.

7. The image processing system according to claim 6, wherein:

said address generator circuit further includes an extractor circuit for extracting, from among inner product values found by said circuit for finding inner products, values of inner products pertaining to pixels in a spotlight fade region, and a normalizing circuit for normalizing output from said extractor circuit.

8. The image processing system according to any one of claims 5 to 7, wherein:

said table for holding a plurality of characteristic values corresponding to a prescribed spotlight characteristic curve includes two banks for holding even numbered characteristic values and odd numbered characteristic values of said plurality of characteristic values, respectively, and said interpolator finds interpolated values between mutually adjacent characteristic values read out, respectively, from said two-bank table.

9. A method of forming spotlight characteristics for pixels configuring polygons comprising the steps of:

holding a plurality of characteristic values corresponding to a prescribed spotlight characteristic curve in a two-dimensional table having as parameters two independent components extracted from light vectors extending from a spotlight light source toward pixels or from pixels toward a spotlight light source;

reading out characteristic values from said two-dimensional table, based on said two parameters; and forming a spotlight characteristic curve from said characteristic values so read out or from interpolated values between mutually adjacent characteristic values read out from said table.

10. An image processing system, for imparting light-source based illumination effects to objects graphically displayed by multiple polygons, comprising:

a memory for preserving information on multiple light sources;

means for implementing shading based on information on a prescribed number of light sources specified by identifier symbols contained in pixel data for each of a plurality of pixels configuring a polygon; and means for reading out information on said prescribed number of light sources, corresponding to said polygon, from said memory, and supplying said information to said means for implementing shading.

11. The image processing system according to claim 10, wherein said prescribed number of light sources is associated based on distances between said polygons and said light sources.

12. The image processing system according to claim 10, wherein said prescribed number of light sources is such that at least some thereof overlap different polygons.

13. An image processing system, for imparting light-source based illumination effects to objects graphically displayed by multiple polygons, comprising:

a first memory for preserving information on a plurality of light sources;

a second memory for preserving a plurality of information on a group of a plurality of light sources;

means for implementing shading based on information on light sources corresponding to said group of plurality of light sources specified by an identifier symbol contained in pixel data for each of plurality of pixels configuring a polygon; and means for reading out information on said group of plurality of light sources corresponding to said polygon, from said second memory, and for reading out light source information corresponding to said group of plurality of light sources according to information on said group of plurality of light sources, from said first memory, and supplying said information to said means for implementing shading.

14. The image processing system according to claim 13, wherein said group of plurality of light sources is associated based on distances between said polygons and said light sources.

15. The image processing system according to claim 13,
wherein light sources in said group of plurality of light sources are such that at least some thereof overlap different polygons.

16. An image processing method, for imparting light source-based illumination effects to objects graphically displayed by multiple polygons, comprising the steps of:

writing information on a plurality of light sources used in an image scene to memory;

applying identifier symbols to polygons affected by light sources;

performing coordinate conversions on said polygon data;

writing identifier symbols to pixels configuring said polygons;

generating texture based on said pixel data;

reading information on light sources affecting each of said polygons corresponding to said identifier symbols out from memory;

shading said pixels based on light source information read out from said memory; and writing said pixel data to a frame buffer.

17. The image processing method according to claim 16, wherein, for objects configured by a plurality of polygons, said steps of performing coordinate conventions and writing identifier symbols are repeated a number of times equal to number of said polygons.

18. The image processing method according to claim 17, wherein:

for polygons configured by a plurality of pixels, said step of generating texture to the step of writing the pixel data to a frame buffer are repeated a number of times equal to number of said pixels.

19. The image processing method according to claim 16, wherein:

said identifier symbols specify a group of a plurality of light sources having an effect on each polygon.

20. The image processing method according to claim 16, wherein:

said light sources having an effect on each polygon are associated based on distance between said polygon and said light sources.

* * * * *